(12) United States Patent
Asakura et al.

(10) Patent No.: US 8,810,674 B2
(45) Date of Patent: Aug. 19, 2014

(54) OPTICAL APPARATUS, IMAGING APPARATUS AND IMAGING SYSTEM HAVING A SUBSTANTIALLY CONSTANT MTF OR MTF SHAPE

(75) Inventors: Ayako Asakura, Hino (JP); Akikazu Yachi, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 537 days.

(21) Appl. No.: 13/065,253

(22) Filed: Mar. 16, 2011

(65) Prior Publication Data
US 2012/0236171 A1 Sep. 20, 2012

(51) Int. Cl.
*H04N 5/228* (2006.01)

(52) U.S. Cl.
USPC ............ 348/222.1; 348/208.11; 348/259; 348/333.08; 348/335; 348/340

(58) Field of Classification Search
CPC . H04N 5/217; H04N 5/3572; H04N 5/23229; G02B 13/00; G02B 7/365; G02B 27/0025
USPC ........... 348/208.11, 259, 333.08, 335, 340; 359/210.1, 215.1, 355, 362
See application file for complete search history.

(56) References Cited

U.S. PATENT DOCUMENTS

| | | | |
|---|---|---|---|
| 2006/0209292 A1* | 9/2006 | Dowski et al. | 356/121 |
| 2007/0097253 A1 | 5/2007 | Woo et al. | |
| 2009/0122150 A1* | 5/2009 | Shabtay et al. | 348/222.1 |
| 2009/0125105 A1 | 5/2009 | Lesage et al. | |
| 2010/0097487 A1* | 4/2010 | Marom et al. | 348/222.1 |
| 2011/0261247 A1* | 10/2011 | Mathieu | 348/340 |

FOREIGN PATENT DOCUMENTS

| | | |
|---|---|---|
| JP | 11-127382 | 5/1999 |
| JP | 2007-060647 | 3/2007 |
| JP | 2007-122055 | 5/2007 |
| JP | 2008-011492 | 1/2008 |
| JP | 2008-167040 | 7/2008 |
| JP | 2008-276732 | 11/2008 |
| JP | 2009-008935 | 1/2009 |
| JP | 2009-086017 | 4/2009 |
| JP | 2009-169092 | 7/2009 |
| WO | WO 2007/128423 | 11/2007 |
| WO | 2009/069752 | 6/2009 |

* cited by examiner

*Primary Examiner* — Usman Khan
(74) *Attorney, Agent, or Firm* — Kenyon & Kenyon LLP

(57) ABSTRACT

The invention provides an imaging apparatus and an imaging system, each one comprising an optical system having characteristics matching with image restoration processing, thereby achieving effective image restoration processing. To this end, the imaging apparatus or system comprises an imaging device 12, an optical system 11 for forming a subject image on the imaging device 12, and an image processing means 14 for implementing image processing for an image being viewed, the image produced out of the image device 12. The imaging apparatus or system is characterized in that the optical system 11 has a substantially constant MTF at a position where the imaging device 12 is located and in the predetermined distances before and after that position.

56 Claims, 24 Drawing Sheets

Inventive Example 1
(Control of Spherical Aberrations)

(a) Axial (b) Off-Axis (c) Crossing of Freauencies

Inventive Example 5
(Control of Spherical Aberrations)

(a) Axial (b) Off-Axis

OPTICAL APPARATUS, IMAGING APPARATUS AND IMAGING SYSTEM HAVING A SUBSTANTIALLY CONSTANT MTF OR MTF SHAPE

BACKGROUND OF THE INVENTION AND RELATED ART STATEMENT

The present invention relates generally to an optical apparatus used with digital cameras or the like, an imaging apparatus incorporating that optical apparatus, and an imaging system built up of an imaging apparatus and an external add-on, and more specifically to an optical apparatus comprising an optical system compatible with image restoration processing that is implemented for taken images.

So far, there have been a variety of imaging apparatus known, each one designed to project a subject image collected through an optical system onto a CCD or other imaging device for imaging purposes. Generally in such imaging apparatus, a variety of imaging processings have been applied to the taken images, using a filter having predetermined characteristics.

For such imaging apparatus enabling image processings, Patent Publication 1 discloses an imaging apparatus comprising an optical system, an imaging device, a transformation means and a signal processing means, with the use of a first filter and a second filter. The optical system is then designed to keep the amount of focal blurring substantially constant at an in-focus position and in distances before and after that position, and the imaging device is designed to take a subject image formed through the optical system. The transformation means is designed to correct a subject image formed through the imaging device for focal blurring to generate a restored image, and the signal processing means is designed to apply predetermined imaging processing to image signals. The first filter is used for image restoration processing by the transformation means in a still image taking mode, and the second filter is used for image restoration processing by the transformation means in a moving image taking mode or through image display mode.

According to the teachings of Patent Publication 1, simple image restoration processing using filters may be implemented in the moving image taking mode or through image display mode. In turn, this enables the optical system to be simplified without recourse to any costly transformation means, resulting in cost reductions. It is also possible to provide an imaging apparatus without detrimental to restored image quality.

LISTING OF THE PATENT PUBLICATIONS

JP(A) 2008-011492

SUMMARY OF THE INVENTION

In order to make improvements in the prior art, the inventive optical apparatus as well as the inventive imaging apparatus and imaging system, each one incorporating the same, are achievable in any one of the following objects.

Embodiments of the First Inventive Imaging Apparatus

Embodiment 1-1 of one inventive imaging apparatus is characterized by comprising an imaging device, an optical system for forming a subject image on said imaging device, and a transformation means for implementing image processing for an image being viewed, said image produced out of said image device, wherein said optical system has a substantially constant MTF at a position at which said imaging device is set and in predetermined distances before and after that position.

According to Embodiment 1-2 of the inventive imaging apparatus, Embodiment 1-1 is further characterized in that said substantially constant MTF has a spatial frequency that satisfies Condition (1-1):

$$\nu = 1/(2 \times P \times A), \quad 1 < A < 20 \qquad (1\text{-}1)$$

where ν is the spatial frequency, and P is the pixel pitch of the imaging device.

According to Embodiment 1-3 of the inventive imaging apparatus, Embodiment 1-1 is further characterized in that said substantially constant MTF has a spatial frequency that satisfies Condition (1-2):

$$\nu = 1/(2 \times P \times A), \quad 2 < A < 8 \qquad (1\text{-}2)$$

where ν is the spatial frequency, and P is the pixel pitch of the imaging device.

According to Embodiment 1-4 of the inventive imaging apparatus, Embodiment 1-1 is further characterized in that said substantially constant MTF has a spatial frequency that satisfies Condition (1-3)

$$0.001 < \nu/N < 3 \qquad (1\text{-}3)$$

where ν is the spatial frequency, and N is the number of pixels on one side of the imaging device.

Preferably, Embodiments 1-1 to 1-4 of the inventive imaging apparatus should each satisfy any one of the following limitations at the same time.

According to Embodiment 1-5 of the inventive imaging apparatus, any one of Embodiments 1-1 to 1-4 is further characterized in that said optical system has said substantially constant MTF at a minimum F-number.

According to Embodiment 1-6 of the inventive imaging apparatus, any one of Embodiments 1-1 to 1-5 is further characterized in that said substantially constant MTF crosses an MTF of other spatial frequency but not so much that constant becomes zero.

According to Embodiment 1-7 of the inventive imaging apparatus, Embodiment 1-6 is further characterized in that said substantially constant MTF crosses an MTF of other spatial frequency at a position of 10% or less.

According to Embodiment 1-8 of the inventive imaging apparatus, any one of Embodiments 1-1 to 1-7 is further characterized in that the spherical aberration characteristics of said optical system have a peak.

According to Embodiment 1-9 of the inventive imaging apparatus, Embodiment 1-8 is further characterized in that the spherical aberration characteristics of said imaging apparatus have two or more peaks.

According to Embodiment 1-10 of the inventive imaging apparatus, Embodiment 1-9 is further characterized in that the peaks of said spherical aberration characteristics are positioned on a plus side and a minus side.

According to Embodiment 1-11 of the inventive imaging apparatus, any one of Embodiments 1-1 to 1-10 is further characterized in that said optical system comprises a wavefront control device for achieving said substantially constant MTF.

According to Embodiment 1-12 of the inventive imaging apparatus, Embodiment 1-11 is further characterized in that the wavefront control device for achieving said substantially constant MTF comprises an aspheric surface.

According to Embodiment 1-13 of the inventive imaging apparatus, Embodiment 1-1 is further characterized in that the wavefront control device for achieving said substantially constant MTF is a phase plate.

According to Embodiment 1-14 of the inventive imaging apparatus, Embodiment 1-11 is further characterized in that the wavefront control device for achieving said substantially constant MTF is a lens having a plurality of curvatures on one surface.

According to Embodiment 1-15 of the inventive imaging apparatus, Embodiment 1-14 is further characterized in that the wavefront control device for achieving said substantially constant MTF is a lens having different curvatures at its center and its periphery.

According to Embodiment 1-16 of the inventive imaging apparatus, Embodiment 1-14 or 1-15 is further characterized in that the wavefront control device for achieving said substantially constant MTF is a lens having three curvatures on one surface.

According to Embodiment 1-17 of the inventive imaging apparatus, any one of Embodiments 1-11 to 1-17 is further characterized in that the wavefront control device for achieving said substantially constant MTF is formed of a material for which a doubly refracting crystal is used.

According to Embodiment 1-18 of the inventive imaging apparatus, any one of Embodiments 1-11 to 1-17 is further characterized in that the wavefront control device for achieving said substantially constant MTF is detachable.

In Embodiment 1-18 of the inventive imaging apparatus, any one of Embodiments 1-11 to 1-17 is designed such that the wavefront control device for achieving said substantially constant MTS is detachable.

According to Embodiment 1-19 of the inventive imaging apparatus, any one of Embodiments 1-1 to 1-18 is further characterized in that image processing implemented at said image processing means includes image restoration processing for an image being viewed, said image produced out of said imaging device.

According to Embodiment 1-20 of the inventive imaging apparatus, Embodiment 1-19 is further characterized in that said imaging restoration processing makes use of the imaging characteristic of said optical system.

According to Embodiment 1-21 of the inventive imaging apparatus, Embodiment is further characterized in that said imaging restoration processing implements processing in which a restored image is represented by the following differential equation:

$$f(x,y)=g(x,y)+a_1(x,y)\cdot g(x,y)+\ldots+a_n(x,y)\cdot g^{(n)}(x,y)$$

where f is the restored image, g is an image being viewed, $a_1$, $a_2$, ... $a_n$ are degradation parameters, and $g^{(n)}$ is an $n^{th}$ differential with respect to the image being viewed.

Embodiments of the First Imaging System

Embodiment 1-1 of one inventive imaging system is characterized by comprising any one of the inventive imaging apparatus 1-1 to 1-21, and an external add-on for implementing image restoration processing for an image being viewed, said image taken at said imaging apparatus.

According to Embodiment 1-2 of the inventive imaging system, Embodiment 1-1 is further characterized in that said image restoration processing makes use of the imaging characteristic of said optical system.

According to Embodiment 1-3 of the inventive imaging system, Embodiment 1-1 or 1-2 is further characterized in that said image restoration processing implements processing in which a restored image is represented by the following differential equation:

$$f(x,y)=g(x,y)+a_1(x,y)\cdot g(x,y)+\ldots+a_n(x,y)\cdot g^{(n)}(x,y)$$

where f is the restored image, g is the image being viewed, $a_1$, $a_2$, ... $a_n$ are degradation parameters, and $g^{(n)}$ is an $n^{th}$ differential with respect to the image being viewed.

Embodiment 1-4 of the inventive imaging system is characterized in that said imaging apparatus and said external add-on each comprise a communication means, via which an image being viewed, said image taken at said imaging apparatus, is transmitted to said external add-on.

Embodiments of the First Optical Apparatus

Embodiment 2-1 of the first inventive optical apparatus is designed to form a subject image on an imaging device and implement image restoration processing for an image obtained at said imaging device, and characterized by having an MTF that satisfies the following Condition (2-1):

$$0.1 \leq La/Lb \leq 1, 10 < a < 30, 5 < b < 20 \quad (2\text{-}1)$$

where La is an MTF width at an a % MTF, and Lb is an MTF width at a b % MTF.

According to Embodiment 2-2 of the inventive optical apparatus, Embodiment 2-1 is further characterized in that said MTF satisfies the following Condition (2-2):

$$1 \leq MTF\_H/MTF\_L \leq 2 \quad (2\text{-}2)$$

where MTF_H is the maximum peak value of MTF, and MTF_L is the minimum bottom value of MTF.

According to Embodiment 2-3 of the inventive optical apparatus, Embodiment 2-1 or 2-2 is further characterized in that said MTF satisfies the following Condition (2-3):

$$1 MTF\_H/MTF\_ave \leq 1.7 \quad (2\text{-}3)$$

where MTF_H is the maximum peak value of MTF, and MTF_ave is the average value of MTF within an La range.

According to Embodiment 2-4 of the inventive optical apparatus, Embodiment 2-1 to 2-3 is further characterized in that said MTF satisfies the following Condition (2-4):

$$0.2 \leq La/Lc \leq 1.2 \quad (2\text{-}4)$$

where Lc is the half bandwidth of MTF.

Embodiments of Another Inventive Imaging Apparatus

Embodiment 2-1 of inventive imaging apparatus comprises an imaging device, an optical system for forming a subject image on said imaging device, and an image processing means for implementing image processing for an image obtained at said imaging device, and is characterized in that said optical system has an MTF that satisfying the following Condition (2-1):

$$0.1 \leq La/Lb \leq 1, 10 < a < 30, 5 < b < 20 \quad (2\text{-}1)$$

where La is an MTF width at an a % MTF, and Lb is an MTF width at a b % MTF.

According to Embodiment 2-2 of the inventive imaging apparatus, Embodiment 2-1 is further characterized in that said MTF satisfies the following Condition (2-2):

$$1 \leq MTF\_H/MTF\_L \leq 2 \quad (2\text{-}2)$$

where MTF_H is the maximum peak value of MTF, and MTF_L is the minimum bottom value of MTF.

According to Embodiment 2-3 of the inventive imaging apparatus, Embodiment 2-1 or 2-2 is further characterized in that said MTF satisfies the following Condition (2-3):

$$1 \leq MTF\_H/MTF\_ave \leq 1.7 \qquad (2\text{-}3)$$

where MTF_H is the maximum peak-value of MTF, and MTF_ave is the average value of MTF within an La range.

According to Embodiment 2-4 of the inventive imaging apparatus, Embodiment 2-1 or 2-3 is further characterized in that said MFT satisfies the following Condition (2-4):

$$0.2 \leq La/Lc \leq 1.2 \qquad (2\text{-}4)$$

where Lc is the half bandwidth of MTF.

According to Embodiment 2-5 of the inventive imaging apparatus, any one of Embodiments 2-1 to 2-4 is further characterized in that said MTF has a spatial frequency that satisfies the following Condition (2-5):

$$v=1/(2 \times P \times A), 1 < A < 20 \qquad (2\text{-}5)$$

where v is the spatial frequency, and P is the pixel pitch of the imaging device.

According to Embodiment 2-6 of the inventive imaging apparatus, any one of Embodiment 2-1 to 2-4 is further characterized in that said MTF has a spatial frequency that satisfies the following Condition (2-6):

$$v=1/(2 \times P \times A), 2 < A < 8 \qquad (2\text{-}6)$$

where v is the spatial frequency, and P is the pixel pitch of the imaging device.

According to Embodiment 2-7 of the inventive imaging apparatus, any one of Embodiments 2-1 to 2-4 is further characterized in that said MTF has a spatial frequency that satisfies the following Condition (2-7):

$$0.001 < v/N < 3 \qquad (2\text{-}7)$$

where v is the spatial frequency, and N is the number of pixels on one side of the imaging device.

More preferably, any one of Embodiments 2-1 to 2-7 of the inventive imaging apparatus should satisfy any one of the following limitations at the same time.

According to Embodiment 2-8 of the inventive imaging apparatus, any one of Embodiments 2-1 to 2-7 is further characterized in that said MTF satisfies each of said conditions at a minimum F-number.

According to Embodiment 2-9 of the inventive imaging apparatus, any one of Embodiments 2-1 to 2-8 is further characterized in that said MTF crosses an MTF of other spatial frequency but not so much that contrast does becomes zero.

According to Embodiment 2-10 of the inventive imaging apparatus, Embodiment 2-9 is further characterized in that said MTF crosses an MTF of other spatial frequency at a position of 10% or less.

According to Embodiment 2-11 of the inventive imaging apparatus, any one of Embodiments 2-1 to 2-10 is further characterized in that the spherical aberration characteristics of said optical system have a peak.

According to Embodiment 2-12 of the inventive imaging apparatus, Embodiment 2-11 is further characterized in that the spherical aberration characteristics of said optical system have two or more peaks.

According to Embodiment 2-13 of the inventive imaging apparatus, Embodiment 2-12 is further characterized in that the peaks of said spherical aberration characteristics are positioned on a plus side and a minus side.

According to Embodiment 2-14, any one of Embodiments 2-1 to 2-13 is further characterized by further comprising a wavefront control device for achieving said MTF.

According to Embodiment 2-15 of the inventive imaging apparatus, Embodiment 2-14 is further characterized in that the wavefront control device for achieving said MTF has an aspheric surface.

According to Embodiment 2-16 of the inventive imaging apparatus, Embodiment 2-14 is further characterized in that the wavefront control device for achieving said MTF is a phase plate.

According to Embodiment 2-17 of the inventive imaging apparatus, Embodiment 2-14 is further characterized in that the wavefront control device for achieving said MTF is a lens having a plurality of curvatures on one surface.

According to Embodiment 2-18 of the inventive imaging apparatus, Embodiment 2-14 is further characterized in that the wavefront control device for achieving said MTF is a lens having different curvatures at its center and its periphery.

According to Embodiment 2-19 of the inventive imaging apparatus, Embodiment 2-17 or 2-18 is further characterized in that the wavefront control device for achieving said MTF is a lens having three curvatures on one surface.

According to Embodiment 2-20 of the inventive imaging apparatus, any one of Embodiments 2-14 to 2-19 is further characterized in that the wavefront control device for achieving said MTF is formed of a material for which a doubly refracting crystal is used.

According to Embodiment 2-21 of the inventive imaging apparatus, any one of Embodiments 2-14 to 2-20 is further characterized in that the wavefront control device for achieving said MTF is detachable.

According to Embodiment 2-22 of the inventive imaging apparatus, any one of Embodiments 2-1 to 2-21 is further characterized in that the imaging processing implemented at said imaging processing means includes image restoration processing for an image obtained at said imaging device.

According to Embodiment 2-23 of the inventive imaging apparatus, Embodiment 2-22 is further characterized in that said image restoration means makes use of the imaging characteristic of said optical system.

According to Embodiment 2-24 of the inventive imaging apparatus, Embodiment 2-23 is further characterized in that said image restoration processing implements processing in which a restored image is represented by the following differential equation:

$$f(x,y)=g(x,y)+a_1(x,y) \cdot g(x,y)+ \ldots +a_n(x,y) \cdot g^{(n)}(x,y)$$

where f is said restored image, g is said image, $a_1, a_2, \ldots a_n$ are degradation parameters, and $g^{(n)}$ is an $n^{th}$ differential with respect to said image.

Embodiments of the Second Inventive Imaging System

Embodiment 2-1 of the inventive imaging system is characterized by comprising any one of Embodiments 2-1 to 2-24 of the inventive imaging apparatus and an external add-on for implementing image restoration processing for an image obtained at said imaging device.

According to Embodiment 2-2 of the inventive imaging system, Embodiment 2-1 is further characterized in that said image restoration means makes use of the imaging characteristic of said optical system.

According to Embodiment 2-3 of the inventive imaging system, Embodiment 2-1 or 2-2 is further characterized in that said image restoration processing implements processing in which a restored image is represented by the following differential equation:

$$f(x,y)=g(x,y)+a_1(x,y) \cdot g(x,y)+ \ldots +a_n(x,y) \cdot g^{(n)}(x,y)$$

where f is said restored image, g is said image, $a_1, a_2, \ldots a_n$ are degradation parameters, and $g^{(n)}$ is an $n^{th}$ differential with respect to said image.

Embodiment 2-4 of the inventive imaging system is characterized in that said imaging apparatus and said external add-on each comprise a communication means, via which an image obtained at said imaging device is transmitted to said external add-on.

According to the invention, the restored image makes sure sufficient resolution. It is also possible to obtain an image having an increased depth of focus in a simple way.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION OF PREFERRED EMBODIMENTS

Figure 1:
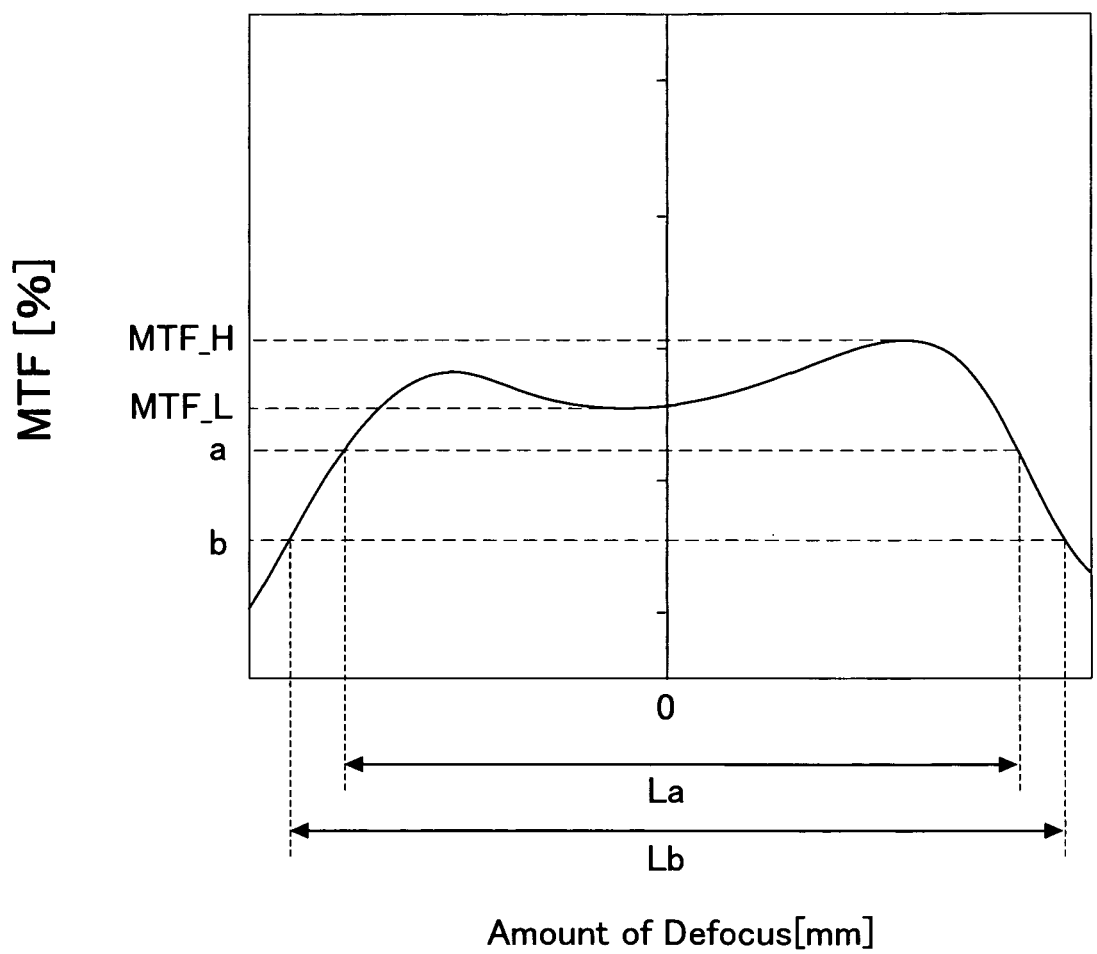
FIG. 1 is illustrative of various parameters in the MTF characteristics of the invention.

Embodiments of the First Inventive Imaging Apparatus

Embodiment 1-1 of the imaging apparatus here is characterized by comprising an optical system for forming a subject image on an imaging device and an image processing means for implementing image processing for an image obtained at the imaging device, wherein the optical system has a substantially constant MTF at a position where the imaging device is locate and in predetermined distances before and after that position. Note here that MTF is an abbreviation of modulation transfer function.

The requirements for, and the advantages of, this Embodiment 1-1 of the inventive imaging apparatus are now explained.

In Embodiment 1-1, the optical characteristics of the optical system used in the imaging apparatus are defined in terms of MTF. In other words, the MTF that the optical system has is defined by its shape while taking into account relations to the position where the imaging device is located. Embodiment 1-1 is designed such that the MTF of the optical system is kept substantially constant or constant at the position where the imaging device is located and at the predetermined positions before and after that position. To put it another way, the optical system has such unique MTF. With such an optical system provided, it is then possible to restore a fully resolved image when the image restoration processing is implemented for an image obtained at this imaging apparatus. It is further possible not only to restore an image having a wide depth of focus, but also to achieve effective implementation of image restoration processing.

The explanation is kept going. At the imaging apparatus, a subject image is formed by the optical system. At this time, the formed image varies in position depending on the position of the subject. Whenever multiple subjects vary in position, each subject image varies in position. Suppose here that focus is on a certain reference subject. Images of other subjects will be formed before and after the image position of that subject (hereinafter called the reference image position), and an in-focus subject image will be obtained at the reference image position, but there will be out-of-focus (blurred) subject images obtained before and after the reference image position.

In Embodiment 1-1, the MTF value of the optical system is substantially the same at the reference image position and positions (in predetermined distances) before and after the reference image position. This means that with position (the image position of the subject) as abscissa and the value of MTF as ordinate, the value of MTF remains substantially constant in a certain range of the abscissa. Note here that in the imaging apparatus, the imaging device is usually located at the reference image position. In other words, the position where the imaging device is located may be regarded as the reference image position.

Thus in Embodiment 1-1, the MTF is kept substantially constant at the reference image position and positions before and after that position so that images obtained at the reference position and nearby positions can each have much the same image characteristics (image quality, degree of blurring, and so on). Therefore, for instance when image restoration processing for bringing the MTF up is implemented at the image restoration means, the MTF can be restored as much at the image at each position. In other words, a fully resolved image can be restored at each pixel throughout the image, and an image having a wide depth of focus can be reconstructed. Note here that the substantially constant referred to in Embodiment 1-1 means a range (width of fluctuations) in which when the image restoration processing is implemented, image restoration takes place at many pixels, just as much as good enough resolution is obtained.

On the other hand, as there is a large difference between the MTF at the position where the imaging device is located and the MTF in the predetermined distances before and after that position, it would result in an image of noticeably low resolution even when the image restoration processing is implemented.

Preferably for Embodiments 1-1, it is preferable to have any one of the following limitations (embodiments) 1-2 to 1-4.

According to Embodiment 1-2, Embodiment 1-1 is further characterized in that a spatial frequency at which the MTF remains substantially constant satisfies the following Condition (1-1):

$$\nu = 1/(2 \times P \times A), 1 < A < 20 \tag{1-1}$$

where $\nu$ is the spatial frequency, and P is the pixel pitch of the imaging device.

The requirements for, and the advantage of, Embodiment 1-2 of the inventive imaging apparatus are now explained. One requirement for Embodiment 1-2 is that there is a spatial frequency at which the substantially constant MTF is found. In Embodiment 1-2, the spatial frequency at which the substantially constant MTF is found is defined using the maximum spatial frequency of the imaging device having a pixel pitch P: $\nu max = 1/(2 \times P)$ and a coefficient A. Especially in Embodiment 1-2, the lower limit to the spatial frequency $\nu$ is set at $\nu max/20$. Another requirement for Embodiment 1-2 is that within the range of this spatial frequency $\nu$, there is at least one substantially constant MTF at the position where the imaging device is located and in the predetermined distances before and after that position. By use of an optical system meeting two such requirements, it is possible not only to restore a fully resolved image, but also to make sure effective image restoration processing.

According to Embodiment 1-3, Embodiment 1-1 is further characterized in that the spatial frequency at which the MTF remains substantially constant satisfies the following Condition (1-2):

$$\nu = 1/(2 \times P \times A), 2A < 8 \tag{1-2}$$

where $\nu$ is the spatial frequency, and P is the pixel pitch of the imaging device.

The requirements for, and the advantages of, Embodiment 1-3 of the inventive imaging apparatus are now explained. In this Embodiment 1-3, the spatial frequency at which the substantially constant MTF is found is defined as in Embodiment 1-2. The range of the spatial frequency here is set narrower than that in Embodiment 1-2 so that much better image restoration processing can be implemented. More specifically, given the maximum spatial frequency $\nu$ max, the upper and lower limits to the spatial frequency are set at $\nu max/2$ and $\nu max/8$, respectively. By satisfaction of this requirement, it is possible not only to restore a more resolved image but also to provide more effective implementation of image restoration processing.

According to Embodiment 1-4, Embodiment 1-1 is further characterized in that the spatial frequency at which the MTF remains substantially constant satisfies the following Condition (1-3):

$$0.001 < \nu/N < 3 \tag{1-3}$$

where $\nu$ is the spatial frequency, and N is the number of pixels on one side of the imaging device.

The requirements for, and the advantages of, Embodiment 1-4 of the inventive imaging apparatus are now explained. In Embodiment 1-4, too, the spatial frequency at which the substantially constant MTF is found is defined. More specifically, the upper and lower limits to the spatial frequency are defined using the number of pixels on one side of the imaging device used in the imaging apparatus. The "number of pixels on one side of the imaging device" here refers to the more of pixels lined up on the lengthwise and widthwise sides of the rectangular imaging device. The requirement for Embodiment 1-4 is that within the range of that spatial frequency $\nu$, there is at least one substantially constant MTF at the position where the imaging device is located and in the predetermined distances before and after that position. By satisfaction of this requirement, it is possible not only to restore a fully resolved image but also to provide effective implementation of image restoration processing.

More preferably, Embodiments 1-1 to 1-4 of the inventive imaging apparatus satisfy any one of the following limitations (embodiments).

According to Embodiment 1-5 of the inventive imaging apparatus, any one of Embodiments 1-1 to 1-4 is further characterized in that the optical system has a substantially constant MTF at a minimum F-number.

The requirement for Embodiment 1-5 is that the optical system has a substantially constant MTF at a minimum F-number at which the depth of focus becomes shallowest. When the optical system has a variable stop, it is necessary to have a substantially constant MTF at a minimum F-number. Thus, even with the variable stop varied in position, it is possible to obtain the substantially constant MTF. Consequently, no matter where the stop is positioned, it is possible to restore the obtained image to a fully resolved one. It is also possible to provide effective implementation of image restoration processing.

According to Embodiment 1-6 of the inventive imaging apparatus, any one of Embodiments 1-1 to 1-5 is further characterized in that the substantially constant MTF crosses an MTF of other spatial frequency but not so much that contrast becomes zero.

Embodiment 1-6 ensures that at an MTF of the desired spatial frequency, an MTF at the position where the imaging device is located and the predetermined positions before and after that position has a substantially constant site in relations to an MTF of other spatial frequency. Specifically, suppose here that the MTF at the desired spatial frequency is superposed on the MTF at other spatial frequency. In this case, given the MTF of the desired spatial frequency remains substantially constant, it will cross the MTF of other spatial frequency but not so much that contrast becomes zero. Note here that contrast being zero corresponds to a position where black pixels are turned white and vice versa, and contrast becomes just zero.

According to Embodiment 1-7 of the inventive imaging apparatus, Embodiment 1-6 is further characterized in that the substantially constant MTF crosses an MTF of other spatial frequency at a 10% or less position.

In Embodiment 1-7, the requirement for making Embodiment 1-6 much better is defined. Embodiment 1-7 ensures that at the MTF of the desired spatial frequency, the MTF at the position where the imaging device is located and the predetermined positions before and after that position has a substantially constant site in relations to the MTF of other spatial frequency.

According to Embodiment 1-8 of the inventive imaging apparatus, any one of Embodiments 1-1 to 1-7 is further characterized in that the spherical aberration characteristics of the optical system have a peak.

The requirement for Embodiment 1-8 is that based on the spherical aberration characteristics of the optical system, the MTF at the position where the imaging device is located and the predetermined positions before and after that position remains substantially constant. When the spherical aberration characteristics have a peak, they will fluctuate in both directions, plus and minus. Thus, if the spherical aberration characteristics are permitted to fluctuate in both directions, then light rays can be dispersed near the position where the imaging device is located. With this requirement, it is possible to achieve an optical system having a substantially constant MTF.

According to Embodiment 1-9 of the inventive imaging apparatus, Embodiment 1-8 is further characterized in that the spherical aberration characteristics have two or more peaks.

With the requirement for Embodiment 1-9, it is possible to make Embodiment 1-8 much better. Thus, as the spherical aberration characteristics have two or more peaks, they will fluctuate at least twice in both directions, plus and minus. With this requirement, it is possible to achieve an optical system having a substantially constant MTF.

According to Embodiment 1-10 of the inventive imaging apparatus, Embodiment 1-9 is further characterized in that the spherical aberration characteristics have peaks positioned on a plus side and a minus side.

With the requirement for Embodiment 1-10, it is possible to make Embodiment 1-9 much better. Thus, as the spherical aberration characteristics have peaks positioned on both sides, plus and minus, it is possible to achieve an optical system having a substantially constant MTF.

According to Embodiment 1-11 of the inventive imaging apparatus, any one of Embodiments 1-1 to 1-10 is further characterized by comprising a wavefront control device for achieving the substantially constant MTF.

The provision of the wavefront control device makes it possible to achieve an optical system having a substantially constant MTF.

According to Embodiment 1-12 of the inventive imaging apparatus, Embodiment 1-11 is further characterized in that the wavefront control device for achieving the substantially constant MTF has an aspheric surface.

The incorporation of the aspheric surface in the wavefront control device makes it possible to achieve an optical system having a substantially constant MTF. For the wavefront control device having this aspheric surface, use may be made of an aspheric lens or plate, a multi-focal lens having an aspheric surface in any area or the like.

According to Embodiment 1-13 of the inventive imaging apparatus, Embodiment 1-11 is further characterized in that the wavefront control device for achieving the substantially constant MTF is a phase plate.

By using the phase plate as the wavefront control device, it is possible to achieve an optical system having a substantially constant MTF.

According to Embodiment 1-14 of the inventive imaging apparatus, Embodiment 1-11 is further characterized in that the wavefront control device for achieving the substantially constant MTF is lens having a plurality of curvatures on one surface.

By using as the wavefront control device a lens having a plurality of curvatures on one surface, it is possible to achieve an optical system having a substantially constant MTF. One curvature embraces just only a given radius of curvature that a spherical shape has as an example but a curvature that an aspheric shape has and is figured out from a given calculation formula as well.

According to Embodiment 1-15 of the inventive imaging apparatus, Embodiment 1-14 is further characterized in that the wavefront control device for achieving the substantially constant MTF is a lens having different curvatures at its center and its periphery.

By using as the wavefront control device a lens having different curvatures at its center and its periphery, it is possible to achieve an optical system having a substantially constant MTF.

According to Embodiment 1-16 of the inventive imaging apparatus, Embodiment 1-14 or 1-15 is further characterized in that the wavefront control device for achieving the substantially constant MTF is a lens having three curvatures on one surface.

By using as the wavefront control device a lens having three curvatures on one surface, it is possible to achieve an optical system having a substantially constant MTF.

According to Embodiment 1-17 of the inventive imaging apparatus, any one of Embodiments 1-11 to 1-16 is further characterized in that the wavefront control device for achieving the substantially constant MTF is formed of a material for which a doubly refracting crystal is used.

By using a doubly refracting crystal for the material of the wavefront control device, it is possible to achieve an optical system having a substantially constant MTF.

According to Embodiment 1-18 of the inventive imaging apparatus, any one of Embodiments 1-11 to 1-17 is further characterized in that the wavefront control device for achieving the substantially constant MTF is detachable.

According to that embodiment, the wavefront control device for achieving the substantially constant MTF may be either pulled out of the optical system or replaced with another optical device. An optical system having a substantially constant MTF and another optical system may be integrated into a single apparatus so that whenever necessary, that apparatus may be varied to the desired MTF characteristics.

According to Embodiment 1-19 of the inventive imaging apparatus, any one of Embodiments 1-1 to 1-18 is further characterized in that image processing implemented at the image processing means includes image restoration processing applied to an image obtained at the imaging device.

According to Embodiment 1-19, only a single imaging apparatus may be used for imaging (image taking) as well as for implementing image restoration processing for a taken image.

According to Embodiment 1-20 of the inventive imaging apparatus, Embodiment 1-19 is further characterized in that the image restoration processing makes use of the imaging characteristic of the optical system.

According to Embodiment 1-20, the imaging characteristic of the optical system is used for the image restoration processing, resulting in more effective image restoration processing.

According to Embodiment 1-21 of the inventive imaging apparatus, Embodiment 1-20 is further characterized in that the image restoration processing implements processing in which a restored image is represented by the following differential equation:

$$f(x,y)=g(x,y)+a_1(x,y) \cdot g(x,y)+ \ldots +a_n(x,y) \cdot g^{(n)}(x,y)$$

where f is the restored image, g is an image being viewed, $a_1$, $a_2$, ... $a_n$ are degradation parameters, and $g^{(n)}$ is an $n^{th}$ differential with respect to the image being viewed.

According to Embodiment 1-21, a degradation parameter that changes depending on the position of an image or the so-called space variant parameter is used as the imaging characteristic of the optical system for filtering so that more effective image restoration processing can be implemented.

Embodiments of the First Imaging System

Embodiment 1-1 of the inventive imaging system is characterized by comprising an imaging apparatus recited in any one of Embodiments 1-1 to 1-21 of the inventive imaging apparatus, and an external add-on for implementing image restoration processing for an image taken through the imaging apparatus.

According to Embodiment 1-1 of the inventive imaging system, the image restoration processing is implemented by the external add-on so that processing loads within the imaging apparatus can be reduced. Consequently, it is possible to curtail the cost of the imaging apparatus and make processing faster.

According to Embodiment 1-2 of the inventive imaging system, Embodiment 1-1 is further characterized in that the image restoration processing makes use of the imaging characteristic of the optical system.

According to Embodiment 1-2 of the imaging system, the image restoration processing is implemented making use of the imaging characteristic of the optical system so that the image restoration processing can become more effective.

According to Embodiment 1-3 of the inventive imaging system, Embodiment 1-1 or 1-2 is further characterized in that the image restoration processing implements processing in which a restored image is represented by the following differential equation:

$$f(x,y)=g(x,y)+a_1(x,y) \cdot g(x,y)+ \ldots +a_n(x,y) \cdot g^{(n)}(x,y)$$

where f is the restored image, g is the image being viewed, $a_1$, $a_2$, ... $a_n$ are degradation parameters, and $g^{(n)}$ is an $n^{th}$ differential with respect to the image being viewed.

According to Embodiment 1-3 of the imaging system, a degradation parameter that changes depending on the position of an image or the so-called space variant parameter is used as the imaging characteristic of the optical system for filtering so that the image restoration processing can become more effective.

Embodiment 1-4 of the inventive imaging system is characterized in that the imaging apparatus and the external add-on each comprise a communication means, via which an image taken at the imaging apparatus is transmitted to the external add-on.

According to Embodiment 1-4 of the imaging system, the image taken at the imaging apparatus can be provided to the external add-on in a simple way. It is also possible to curtail the recording capacity and throughput of the imaging apparatus.

Embodiments of the Second Optical Apparatus

Embodiment 2-1 of the second inventive optical apparatus is characterized in that a subject image is formed on an imaging device, and image restoration processing is implemented for an image obtained at said imaging device, wherein the optical apparatus has an MTF that satisfies the following Condition (2-1):

$$0.1 \leq La/Lb \leq 1, 10a<30, 5<b<20 \quad (2-1)$$

where La is an MTF width at an a % MTF, and Lb is an MTF width at a b % MTF.

The requirements for, and the advantages of, Embodiment 2-1 of the inventive optical apparatus are now explained.

At the imaging apparatus, a subject image is formed by the optical system. At this time, the formed image varies in position depending on the subject position. Whenever multiple subjects vary in position, each subject image varies in position. Suppose here that focus is on a certain reference subject. Images of other subjects will be formed before and after the image position of that subject (hereinafter called the reference image position), and an in-focus subject image will be obtained at the reference image position, but there will be out-of-focus (blurred) subject images obtained before and after the reference image position.

The requirement for Embodiment 2-1 is that the MTF characteristics have a constant or substantially constant shape. Note here that MTF is an abbreviation of modulation transfer function. FIG. 1 is illustrative in schematic of various parameters for the inventive optical apparatus, more specifically, the MTF characteristics of the optical system. Shown in FIG. 1 is the amount of defocus: the MTF characteristics with the values of MTF in the direction (as abscissa) along the optical axis. The MTF width here refers to the distance between both endmost extremities of the MTF characteristics, and even with crossing of the MTF characteristics on the way between both endmost extremities, that crossing is factored out. As shown in FIG. 1, the MTF width is given by La at an a % MTF, and by Lb at a b % MTF.

By satisfaction of Condition (2-1), the shape of the MTF characteristics can be kept constant or substantially constant. In this case, images obtained at and near a reference position can have virtually the same image characteristics (image quality, the degree of blurring, etc.) so that when the image restoration processing is applied to each image, image restoration can effectively be implemented.

For instance when there is restoration processing implemented in such a way as to bring up MTF characteristics, the MTF can be restored as much for each pixel of the image. In other words, sufficient resolution can be achieved for each of image-forming pixels with the result that not only can a fully resolved image be restored, but it can also be reconstructed as an image having a wide depth of focus. Note here that the substantially constant MTF means such a range (of fluctuation) that when the image restoration processing is implemented, image restoration takes place at many pixels, just as much as sufficient resolution is obtained.

When Condition (2-1) is not satisfied, on the other hand, there is an increasing MTF difference (range of fluctuation) between the predetermined positions before and after the position where the imaging device is located. In this case, even though the image restoration processing is implemented, there will be an image having more noticeable resolution changes.

According to Embodiment 2-2 of the inventive optical apparatus, Embodiment 2-1 is further characterized in that the MTF satisfies the following Condition (2-2):

$$1 MTF\_H/MTF\_L \leq 2 \quad (2-2)$$

where MTF_H is the maximum peak value of MTF, and MTF_L is the minimum bottom value of MTF.

The requirements for, and the advantages of, Embodiment 2-2 of the inventive optical apparatus is now explained. The requirement for Embodiment 2-2 is that the upper and lower limits to the ratio of the maximum peak value (MTF_H) of MTF relative to the minimum bottom value MTF_L of MTF are set at 2 and 1, respectively, so that the MTF characteristics can have a constant or substantially constant shape. Note here that the "peak value of MTF" refers to a value at which the MTF turns from going up to going down: the maximum value of the MTF characteristics, whereas the "bottom value of MTF" refers to a value at which the MTF turns from going down to going up. Shown in the MTF characteristics schematic graph of FIG. 1 are the maximum and minimum peak values MTF☐H and MTF☐L.

Especially in Embodiment 2-2, there is the upper limit imposed on the ratio of the maximum peak value MTF☐H of MTF to the minimum bottom value MTF☐L of MTF so that MTF changes relative to the amount of defocus can be reduced. This in turn permits the shape of MTF characteristics to remain substantially constant. With such an optical apparatus, the image restoration processing can effectively be implemented. To put it another way, a fully resolved image can be restored.

When Condition (2-2) is not satisfied, on the other hand, there is an increasing MTF difference (range of fluctuation) between the predetermined positions before and after the position where the imaging device is located. In this case, even though the image restoration processing is implemented, there will be an image having more noticeable resolution changes.

According to Embodiment 2-3 of the inventive optical apparatus, Embodiment 2-1 or 2-2 is further characterized in that the MTF satisfies the following Condition (2-3):

$$1 \leq MTF\_H/MTF\_ave \leq 1.7 \tag{2-3}$$

where MTF_H is the maximum peak value of MTF, and MTF_ave is the average value of MTF within an La range.

The requirements for, and the advantages of, Embodiment 2-3 of the inventive optical apparatus are now explained. The requirement for Embodiment 2-3 is that the upper and lower limits to the ratio of the maximum peak value MTF_H of MTF relative to the average value MTF_ave of MTF in the range of the MTF width La are set at 1.7 and 1, respectively, so that the shape of the MTF characteristics can remain constant or substantially constant.

When Condition (2-3) is not satisfied, there is an increasing MTF difference (range of fluctuation) between the predetermined positions before and after the position where the imaging device is located. In this case, even though the image restoration processing is implemented, there will be an image having more noticeable resolution changes.

According to Embodiment 2-4 of the inventive optical apparatus, any one of Embodiments 2-1 to 2-3 is further characterized in that the MTF satisfies the following Condition (2-4):

$$0.2 \leq La/Lc \leq 1.2 \tag{2-4}$$

where Lc is the half bandwidth of MTF.

The requirements for, and the advantages of, Embodiment 2-4 of the inventive optical apparatus are now explained. The requirement for Embodiment 2-4 is that the upper and lower limits to the ratio of the maximum peak value MTF_H of MTF relative to the half bandwidth Lc of MTF are set at 1.2 and 0.2, respectively, so that the MTF characteristics can have a constant or substantially constant shape. Note here that the "half bandwidth Lc of MTF" refers to the MTF width at an MTF value that is half the maximum peak value (maximum value) of MTF.

When Condition (2-4) is not satisfied, there is an increasing MTF difference (range of fluctuation) between the predetermined positions before and after the position where the imaging device is located. In this case, even though the image restoration processing is implemented, there will be an image having more noticeable resolution changes.

Preferably in Embodiment 2-4 of the inventive optical apparatus, the lower limit should be 0.2 because more preferable MTF characteristics are achievable.

Embodiments of the Second Inventive Imaging Apparatus

Embodiment 2-1 of the inventive imaging apparatus is characterized by comprising an imaging device, an optical system for forming a subject image on the imaging device, and an image processing means for implementing image processing for an image obtained at the imaging device, wherein the optical system has an MTF that satisfies the following Condition (2-1):

$$0.1 \leq La/Lb \leq 1, 10 < a < 30, 5 < b < 20 \tag{2-1}$$

where La is an MTF width at an a % MTF, and Lb is an MTF width at a b % MTF.

According to Embodiment 2-2 of the inventive imaging apparatus, Embodiment 2-1 is further characterized in that the MTF satisfies the following Condition (2-2):

$$1 \leq MTF\_H/MTF\_L \leq 2 \tag{2-2}$$

where MTF_H is the maximum peak value of MTF, and MTF☐L is the minimum bottom value of MTF.

According to Embodiment 2-3 of the inventive imaging apparatus, Embodiment 2-1 or 2-2 is further characterized in that the MTF satisfies the following Condition (2-3):

$$1 MTF\_H/MTF\_ave \leq 1.7 \tag{2-3}$$

where MTF_H is the maximum peak value of MTF, and MTF_ave is the average value of MTF within an La range.

According to Embodiment 2-4 of the inventive imaging apparatus, any one of Embodiment 2-1 to 2-3 is further characterized in that the MTF satisfies the following Condition (2-4):

$$0.2 \leq La/Lc \leq 1.2 \tag{2-4}$$

where Lc is the half bandwidth of MTF.

Embodiments 2-1 to 2-4 of the inventive imaging apparatus each comprise any one of the aforesaid Embodiments 2-1 to 2-4 of the inventive optical apparatus (optical systems), to which an imaging device and an image processing means are added, said image processing means being provided for implementing image processing for an image obtained at the imaging device. According to those Embodiments 2-1 to 2-4 of the inventive imaging apparatus, a subject image is formed by the optical system having a constant or substantially constant MTF characteristics shape. And by taking that subject image at the imaging device, it is possible to obtain a subject image (an image being viewed), and it is possible to effectively implement image processing for that subject image. That is, a fully resolved image can be restored.

According to Embodiment 2-5 of the inventive imaging apparatus, any one of Embodiments 2-1 to 2-4 is further characterized in that the MTF has a spatial frequency that satisfies the following Condition (2-5):

$$v = 1/(2 \times P \times A), 1 < A < 20 \tag{2-5}$$

where ν is the spatial frequency, and P is the pixel pitch of the imaging device.

The requirements for, and the advantages of, Embodiment 2-5 of the inventive imaging apparatus is now explained. One requirement for Embodiment 2-5 is that there is a spatial frequency at which the substantially constant MTF is found. In Embodiment 2-5, the spatial frequency at which the substantially constant MTF is found is defined using the maximum spatial frequency of the imaging device having a pixel pitch P: νmax=1/(2×P) and a coefficient A. Especially in Embodiment 2-5, the lower limit to the spatial frequency ν is set at νmax/20. Another requirement for Embodiment 2-5 is that within the range of this spatial frequency ν, there is at least one substantially constant MTF at the position where the imaging device is located and in the predetermined distances before and after that position. By use of the optical system meeting those requirements, it is possible to provide effective implementation of image restoration processing. In other words, a fully resolved image can be restored.

According to Embodiment 2-6 of the inventive imaging apparatus, any one of Embodiments 2-1 to 2-4 is further characterized in that the MTF satisfies the following Condition (2-6):

$$\nu = 1/(2 \times P \times A), \quad 2 < A < 8 \quad (2\text{-}6)$$

where ν is the spatial frequency, and P is the pixel pitch of the imaging device.

The requirements for, and the advantages of, Embodiment 2-6 of the inventive imaging apparatus are now explained. In this Embodiment 2-6, the spatial frequency at which the substantially constant MTF is found is defined as in Embodiment 2-5. The range of the spatial frequency here is set narrower than that in Embodiment 2-5 so that much better image restoration processing can be implemented. More specifically, given the maximum spatial frequency ν max, the upper and lower limits to the spatial frequency are set at νmax/2 and νmax/8, respectively. By satisfaction of this requirement, it is possible to provide effective implementation of image restoration processing; it is possible to restore a more resolved image.

According to Embodiment 2-7 of the inventive imaging apparatus, any one of Embodiments 2-1 to 2-4 is further characterized in that the MTF has a spatial frequency that satisfies the following Condition (2-7):

$$0.001 < \nu/N < 3 \quad (2\text{-}7)$$

where ν is the spatial frequency, and N is the number of pixels on one side of the imaging device.

The requirements for, and the advantages of, Embodiment 2-7 of the inventive imaging apparatus are now explained. In Embodiment 2-7, too, the spatial frequency at which the substantially constant MTF is found is defined. More specifically, the upper and lower limits to the spatial frequency are defined using the number of pixels on one side of the imaging device used in the imaging apparatus. The "number of pixels on one side of the imaging device" here refers to the more of pixels lined up on the lengthwise and widthwise sides of the rectangular imaging device. The requirement for Embodiment 2-7 is that within the range of that spatial frequency ν, there is at least one substantially constant MTF at the position where the imaging device is located and in the predetermined distances before and after that position. By satisfaction of this requirement, it is possible to provide effective implementation of image restoration processing; it is possible to restore a fully resolved image.

More preferably, Embodiments 2-1 to 2-7 of the inventive imaging apparatus satisfy any one of the following limitations (embodiments).

According to Embodiment 2-8 of the inventive imaging apparatus, any one of Embodiments 2-1 to 2-7 is further characterized in that the MTF satisfies each of the aforesaid conditions at a full aperture F-number.

The requirement for Embodiment 2-8 is that the optical system has a substantially constant MTF at a minimum F-number at which the depth of focus becomes shallowest. When the optical system has a variable stop, it is necessary to have a substantially constant MTF at a minimum F-number. Thus, even with the variable stop varied in position, it is possible to obtain the substantially constant MTF. Consequently, no matter where the stop is positioned, it is possible to provide effective implementation of image restoration processing for the obtained image; it is possible to restore a fully resolved image.

According to Embodiment 2-9 of the inventive imaging apparatus, any one of Embodiments 2-1 to 2-8 is further characterized in that the MTF crosses an MTF of other spatial frequency but not so much that contrast becomes zero.

Embodiment 2-9 ensures that at the MTF of the desired spatial frequency, an MTF at the position where the imaging device is located and the predetermined positions before and after that position has a substantially constant site in relations to an MTF of other spatial frequency. Specifically, suppose here that the MTF at the desired spatial frequency is superposed on the MTF at other spatial frequency. In this case, given the MTF of the desired spatial frequency remains substantially constant, it will cross the MTF of other spatial frequency but not so much that contrast becomes zero. Note here that contrast being zero corresponds to a position where black pixels are turned white and vice versa, and contrast becomes just zero.

According to Embodiment 2-10 of the inventive imaging apparatus, Embodiment 2-9 is further characterized in that the MTF crosses an MTF of other spatial frequency at a 10% or less position.

In Embodiment 2-10, the requirement for making Embodiment 2-9 much better is defined. Embodiment 2-10 ensures that at the MTF of the desired spatial frequency, the MTF at the position where the imaging device is located and the predetermined positions before and after that position has a substantially constant site in relations to the MTF of other spatial frequency.

According to Embodiment 2-11 of the inventive imaging apparatus, any one of Embodiments 2-1 to 2-10 is further characterized in that the spherical aberration characteristics of the optical system have a peak value.

The requirement for Embodiment 2-11 is that based on the spherical aberration characteristics of the optical system, the MTF at the position where the imaging device is located and the predetermined positions before and after that position remains substantially constant. When the spherical aberration characteristics have a peak value, they will fluctuate in both directions, plus and minus. Thus, if the spherical aberration characteristics are permitted to fluctuate in both directions, then light rays can be dispersed near the position where the imaging device is located. With this requirement, it is possible to achieve an optical system having a substantially constant MTF.

According to Embodiment 2-12 of the inventive imaging apparatus, Embodiment 2-11 is further characterized in that the spherical aberration characteristics have two or more peak values.

With the requirement for Embodiment 2-12, it is possible to make Embodiment 2-11 much better. Thus, as the spherical aberration characteristics have two or more peak values, they will fluctuate at least twice in both directions, plus and minus. With this requirement, it is possible to achieve an optical system having a substantially constant MTF.

According to Embodiment 2-13 of the inventive imaging apparatus, Embodiment 2-12 is further characterized in that the spherical aberration characteristics have peak values positioned on a plus side and a minus side.

With the requirement for Embodiment 2-13, it is possible to make Embodiment 2-12 much better. Thus, as the spherical aberration characteristics have peak values positioned on both sides, plus and minus, it is possible to achieve an optical system having a substantially constant MTF.

According to Embodiment 2-14 of the inventive imaging apparatus, any one of Embodiments 2-1 to 2-13 is further characterized in that the optical system further comprises a wavefront control device for achieving the substantially constant MTF.

The provision of the wavefront control device makes it possible to achieve an optical system having a substantially constant MTF.

According to Embodiment 2-15 of the inventive imaging apparatus, Embodiment 2-14 is further characterized in that the wavefront control device for achieving the substantially constant MTF has an aspheric surface.

The incorporation of the aspheric surface in the wavefront control device makes it possible to achieve an optical system having a substantially constant MTF. For the wavefront control device having this aspheric surface, use may be made of an aspheric lens or plate, a multi-focal lens having an aspheric surface in any area or the like.

According to Embodiment 2-16 of the inventive imaging apparatus, Embodiment 2-14 is further characterized in that the wavefront control device for achieving the substantially constant MTF is a phase plate.

By using the phase plate as the wavefront control device, it is possible to achieve an optical system having a substantially constant MTF.

According to Embodiment 2-17 of the inventive imaging apparatus, Embodiment 2-14 is further characterized in that the wavefront control device for achieving the substantially constant MTF is lens having a plurality of curvatures on one surface.

By using as the wavefront control device a lens having a plurality of curvatures on one surface, it is possible to achieve an optical system having a substantially constant MTF. One curvature embraces just only a given radius of curvature that a spherical shape has as an example but a curvature that an aspheric shape has and is figured out from a given calculation formula as well.

According to Embodiment 2-18 of the inventive imaging apparatus, Embodiment 2-14 is further characterized in that the wavefront control device for achieving the substantially constant MTF is a lens having different curvatures at its center and its periphery.

By using as the wavefront control device a lens having different curvatures at its center and periphery, it is possible to achieve an optical system having a substantially constant MTF.

According to Embodiment 2-19 of the inventive imaging apparatus, Embodiment 2-17 or 2-18 is further characterized in that the wavefront control device for achieving the MTF is a lens having three curvatures on one surface.

By using as the wavefront control device a lens having three curvatures on one surface, it is possible to achieve an optical system having a substantially constant MTF.

According to Embodiment 2-20 of the inventive imaging apparatus, any one of Embodiments 2-14 to 2-19 is further characterized in that the wavefront control device for achieving the MTF is formed of a material for which a doubly refracting crystal is used.

By using a doubly refracting crystal for the material of the wavefront control device, it is possible to achieve an optical system having a substantially constant MTF.

According to Embodiment 2-21 of the inventive imaging apparatus, any one of Embodiments 2-14 to 2-20 is further characterized in that the wavefront control device for achieving the MTF is detachable.

According to that embodiment, the wavefront control device may be either pulled out of the optical system or replaced with another optical device. An optical system having a substantially constant MTF and another optical system may be integrated into a single apparatus so that whenever necessary, that apparatus may be varied to the desired MTF characteristics.

According to Embodiment 2-22 of the inventive imaging apparatus, any one of Embodiments 2-1 to 2-21 is further characterized in that image processing implemented at the image processing means includes image restoration processing applied to an image obtained at the imaging device.

According to Embodiment 2-22, a single imaging apparatus may be used for imaging (image taking) as well as for implementing image restoration processing for a taken image.

According to Embodiment 2-23 of the inventive imaging apparatus, Embodiment 2-22 is further characterized in that the image restoration processing makes use of the imaging characteristic of the optical system.

According to Embodiment 2-23, the imaging characteristic of the optical system is used for the image restoration processing, resulting in more effective image restoration processing.

According to Embodiment 2-24 of the inventive imaging apparatus, Embodiment 2-23 is further characterized in that the image restoration processing implements processing in which a restored image is represented by the following differential equation:

$$f(x,y) = g(x,y) + a_1(x,y) \cdot g'(x,y) + \ldots + a_n(x,y) \cdot g^{(n)}(x,y)$$

where f is the restored image, g is an image, $a_1, a_2, \ldots a_n$ are degradation parameters, and $g^{(n)}$ is an $n^{th}$ differential with respect to the image.

According to Embodiment 2-24, a degradation parameter that changes depending on the position of an image or the so-called space variant parameter is used as the imaging characteristic of the optical system for filtering so that more effective image restoration processing can be implemented.

Embodiments of the Second Inventive Imaging System

Embodiment 2-1 of the inventive imaging system is characterized by comprising an imaging apparatus recited in any one of Embodiments 2-1 to 2-24 of the inventive imaging apparatus, and an external add-on for implementing image restoration processing for an image obtained at the imaging device.

According to Embodiment 2-1 of the inventive imaging system, the image restoration processing is implemented by the external add-on so that processing loads within the imaging apparatus can be reduced. Consequently, it is possible to curtail the cost of the imaging apparatus and make processing faster.

According to Embodiment 2-2 of the inventive imaging system, Embodiment 2-1 is further characterized in that the image restoration processing makes use of the imaging characteristic of the optical system.

According to Embodiment 2-2 of the inventive imaging system, the image restoration processing is implemented making use of the imaging characteristic of the optical system so that the image restoration processing can be made more effective.

According to Embodiment 2-3 of the inventive imaging system, Embodiment 2-1 or 2-2 is further characterized in that the image restoration processing implements processing in which a restored image is represented by the following differential equation:

$$f(x,y)=g(x,y)+a_1(x,y)\cdot g(x,y)+\ldots+a_n(x,y)\cdot g^{(n)}(x,y)$$

where f is the restored image, g is an image, $a_1, a_2, \ldots a_n$ are degradation parameters, and $g^{(n)}$ is an $n^{th}$ differential with respect to the image.

According to Embodiment 2-3 of the inventive imaging system, a degradation parameter that changes depending on the position of an image or the so-called space variant parameter is used as the imaging characteristic of the optical system for filtering so that the image restoration processing can be made more effective.

Embodiment 2-4 of the inventive imaging system is characterized in that the imaging apparatus and the external add-on each comprise a communication means, via which an image obtained at the imaging device is transmitted to the external add-on.

According to Embodiment 2-4 of the inventive imaging system, the image obtained at the imaging device can be provided to the external add-on in a simple way. It is also possible to curtail the recording capacity and throughput of the imaging apparatus.

The optical systems used in the inventive imaging apparatus are now explained with reference to FIGS. 2 to 21.

Figure 2:
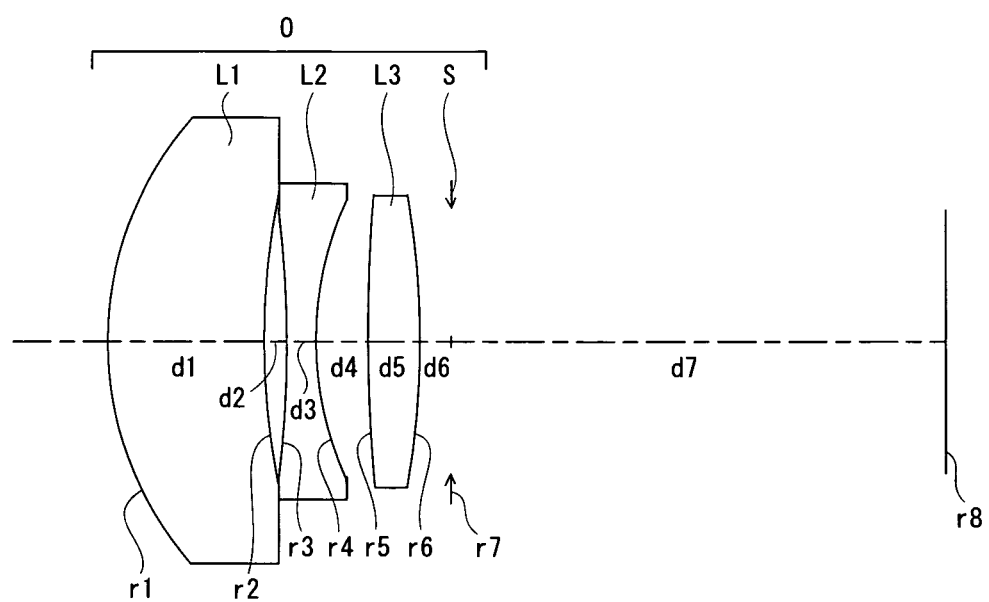
FIG. 2 is illustrative in section as taken apart along the optical axis of the optical systems in Comparative Example 1 and Inventive Examples 1 to 3.

FIG. 2 is a taken-apart, schematic, sectional view of the optical system used in Comparative Example 1 and Inventive Examples 1-4, as taken along optical axis. Comparative Example 1 and Inventive Examples 1-4 are different from one another in terms of the details of the third lens L3.

Comparative Example 1 is provided to explain Inventive Examples 1 to 4, and the third lens L3 used there has spherical shapes on both its surfaces. Comparative Example 1 is different from Inventive Example 1 in that Surface No. 6 (r6) of the third lens L3 is in an aspheric surface, from Inventive Examples 2 and 3 in that Surface No. 5 (r5) of the third lens L3 is a bifocal lens, and from Inventive Example 4 in that Surface No. 5 (r5) of the third lens L3 is a trifocal lens.

In Comparative Example 1, an optical system O shown in FIG. 2 is made up of, in order from the object side to the exit side, a first lens L1, a second lens L2, a third lens L3 and an aperture stop S. A CCD or other imaging device is located on an imaging plane indicated by r8 in FIG. 2.

The first lens L1 is a single lens of positive meniscus shape convex on its object side, the second lens L2 is a single lens of double-concave shape having negative refracting power, and the third lens L3 is a single lens of double-convex shape having positive refracting power.

In Comparative Example 1, the imaging device located on the imaging plane is designed on the presumption that it has a maximum number of 4,000 pixels in the lengthwise or widthwise direction and a pixel pitch of 1.7 (μm). This is true of the inventive examples, too.

Set out below are numeral data in Comparative Example 1, in which r is the radius of curvature of each lens surface (optical surface), d is a surface separation between lens surfaces (optical surfaces), nd is the d-line refractive index of each lens (optical medium), Vd is the Abbe constant of each lens (optical medium), and F is the focal length. Note here that "∞" annexed to the radius of curvature means infinity.

Various data include the focal length and F-number of the optical system. The focal length is given in mm, with the F-number at an open aperture for measurement.

The depth characteristics in mm are represented by MTF widths at a 20% MTF and a 10% MTF, respectively, at an estimation spatial frequency of 84 (lp/mm).

Numeral Comparative Example 1

| Unit mm | | | | | |
|---|---|---|---|---|---|
| Surface Data | | | | | |
| Surface No. | r | d | nd | Vd | F |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5 | 10.7443 | 0.4438 | 1.81067 | 41.00 | 5.0931 |
| 6 | −6.5817 | 0.2367 | | | |
| 7(Stop) | ∞ | 7.7389 | | | |
| 8(Imaging Plane) | ∞ | | | | |

| Various Data | |
|---|---|
| Focal Length | 9.9902 |
| F-number | 3.5 |

| Depth Characteristics (Estimation Spatial Frequency: 84[lp/mm]) | |
|---|---|
| | Depth |
| MTF 20% | 0.09 |
| MTF 10% | 0.11 |

Figure 3:
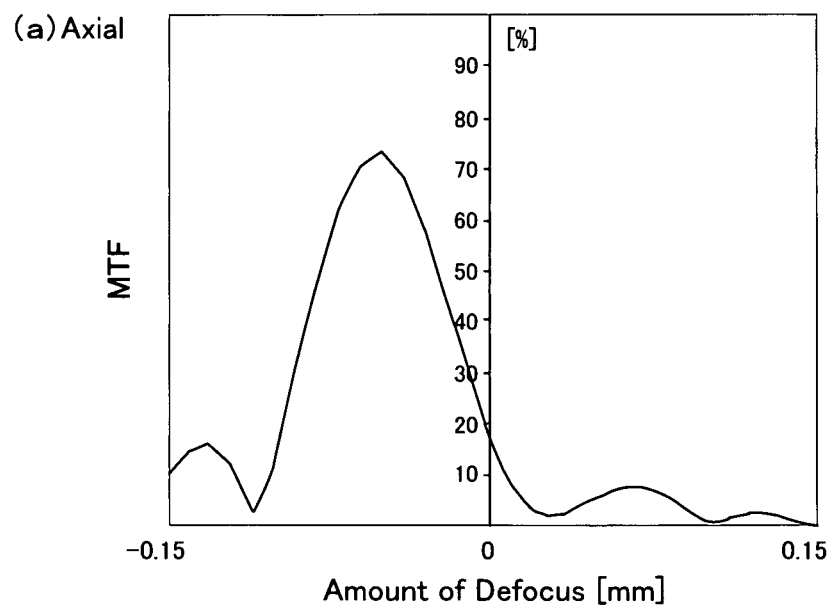
FIG. 3 is indicative of the MTF characteristics of Comparative Example 1.
Figure 4:
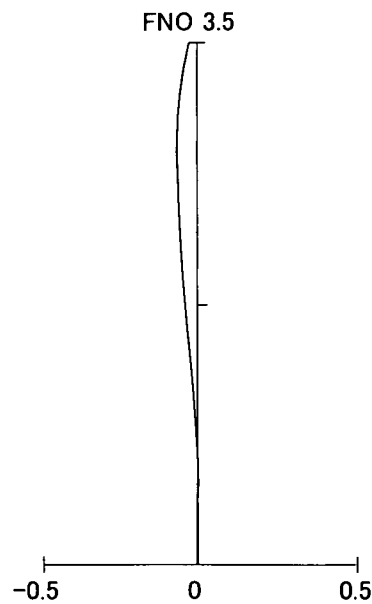
FIG. 4 is indicative of the spherical aberration characteristics of Comparative Example 1.

FIG. 3 is a graph indicative of MTF characteristics at the estimation spatial frequency of 84 (lp/mm) in Comparative Example 1. FIG. 2 shows an MTF (in %) relative to the axial amount of defocus (in mm). The MTF characteristics in Comparative Example 1 have a shape having a sharp peak of about 70% near −0.05 (mm) with respect to a reference position. FIG. 4 is a diagram indicative of spherical aberration characteristics in Comparative Example 1, here at a wavelength of 546.07 (nm).

A numeral example for, and various characteristics, in Inventive Example 1 are now explained. In Inventive Example 1, Surface No. 6 (r6) of the third lens L3 in FIG. 1 is configured as an aspheric surface thereby achieving a substantially constant MTF at the position where the imaging device is located and in the predetermined distances before and after that position. The significances of numerals, and various design conditions are the same as explained in Comparative Example 1. In the surface data, an asterisk "*" attached to the right side of Surface No. means that that lens surface is in an aspheric shape.

In an invention vs. comparison example for the depth characteristics, the MTF width ratios at a 20% MTF and a 10%

MTF, respectively, in Comparative Example 1 are given, and the calculated F-number is the one needed for achieving the MTF width of Inventive. Example 1 in Comparative Example 1.

Suppose here that x is an optical axis with the proviso that the direction of travel of light is set as positive, and y is a direction orthogonal to the optical axis. Then, the aspheric shape is represented by the following formula:

$$x=(y^2/r)/[1+\{1-(K+1)(y/r)^2\}^{1/2}]+A2y^2+A4y^4+A6y^6+A8y^8+A10y^{10}+\ldots$$

where r is the paraxial radius of curvature, K is the conic coefficient, and A2 to A10 are the $2^{nd}$ to $10^{th}$ aspheric coefficients. Note here that the symbol "E" indicates that the following numeral value is a power exponent having 10 as a base; for instance, "1.0E-5" means "$1.0\times10^{-5}$".

Numeral Example 1

Unit mm

Surface Data

| Surface No. | r | d | nd | Vd | F |
|---|---|---|---|---|---|
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5 | 10.7443 | 0.4438 | 1.81067 | 41.00 | 5.0931 |
| 6* | −6.5817 | 0.2367 | | | |
| 7(Stop) | ∞ | 7.7389 | | | |
| 8(Imaging Plane) | ∞ | | | | |

Aspheric Data
$6^{th}$ Surface

K = 0
A2 = −2.01E−12
A4 = 5.98E−03
A6 = −2.08E−02
A8 = 2.19E−02
A10 = −7.06E−03

Various Data

| Focal Length | 9.9902 |
|---|---|
| F-number | 3.5 |

Depth Characteristics
(Estimation Spatial Frequency: 84[lp/mm])

| | Depth | Invention vs. Comparison [%] | Calculated F-Number |
|---|---|---|---|
| MTF20% | 0.16 | 182 | 6.4 |
| MTF10% | 0.25 | 223 | 7.8 |

Figure 5:
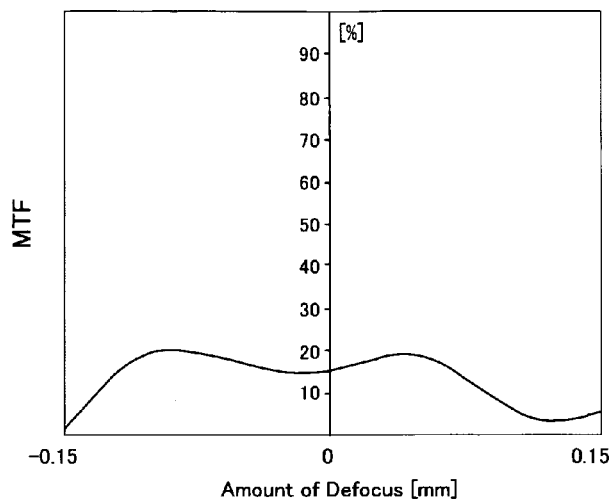
FIG. 5 is indicative of the MTF characteristics of the optical system in Inventive Example 1.
Figure 5:
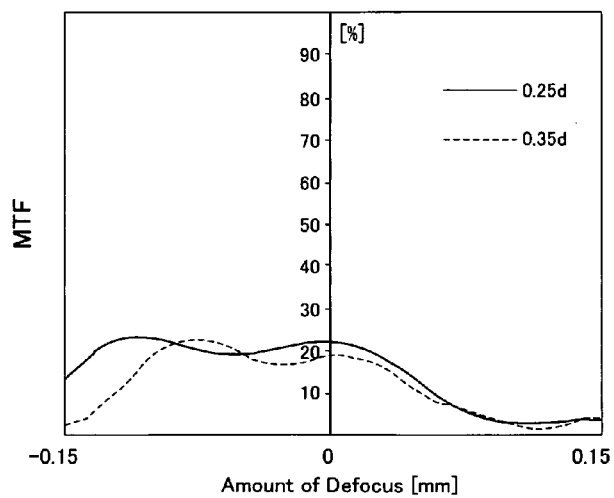
Figure 5:
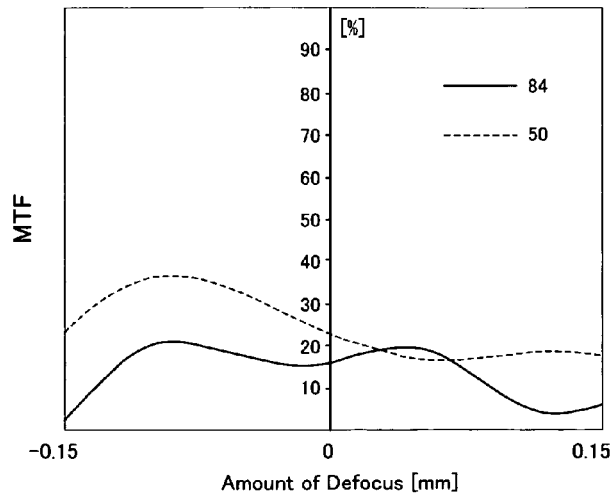

FIG. 5 shows the MTF characteristics in Inventive Example 1: FIG. 5(a) shows axial MTF characteristics, and FIG. 5(b) shows off-axis MTF characteristics. Shown here are two off-axis MTF characteristics at 0.25d and 0.35d (where 0.5 is the maximum height of the imaging plane). Note here that the estimation spatial frequency for both FIGS. 5(a) and 5(b) is set at 84 (lp/mm).

FIG. 5(c) shows MTF characteristics at different estimation spatial frequencies. Shown here are two MTF characteristics at the same 84 (lp/mm) as in FIG. 5(a), and 50 (lp/mm).

As can be seen from a comparison of the axial MTF characteristics shown in FIG. 5(a) with the MTF characteristics of Comparative Example 1 in FIG. 3, a substantially constant, if low, MTF value, is achieved at the position where the amount of defocus is zero: the position wherein the imaging device is set and within the range of the predetermined distances before and after that position.

The MTF having such characteristics (curve) means that if a variety of image restoration processings are applied to the obtained image, it is possible for an image defocused within the given range to have a uniformly increasing MTF so that an image having sufficient resolution can be restored. It is also possible to achieve an image having a deep depth of focus. Note here that the position where the amount of defocus is set at 0: the position where the imaging device is located may properly be determined while taking the shapes of various MTF characteristics in account.

From FIG. 5(b), it can be seen that the optical system has the substantially constant MTF at an axial position, too, as at an off-axis position. From FIG. 5(c), it can also be seen that the MTF characteristics of 84 (lp/mm) crosses the MTF characteristics of 50 (lp/mm) but not so much that contrast becomes zero. Such a state would make sure the MTF characteristics of 84 (lp/mm) remain substantially constant. Note here that contrast being zero corresponds to a position where at the MTF of the spatial frequency of interest, black pixels are turned white and vice versa: the position where the MTF becomes zero.

Figure 6:
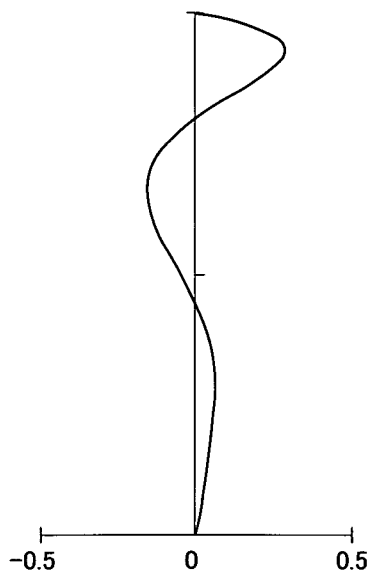
FIG. 6 is indicative of the spherical aberration characteristics of Inventive Example 1.

FIG. 6 is a diagram for spherical aberration characteristics in Inventive Example 1, here at a wavelength of 546.07 (nm). In the spherical aberration characteristics, a curve indicative of aberrations fluctuates in two directions, plus and minus, in contrast to the spherical aberration characteristics of FIG. 4. In FIG. 6, the aberration curve has three peaks, as shown by an arrow. Before and after each peak, the direction of occurrence of aberrations turns from plus to minus or vice versa.

Thus, as the spherical aberration characteristics fluctuate in two directions, plus and minus, it enables the substantially constant MTF to be achieved near the position where the amount of defocus is zero. As shown in Inventive Example 1, it is preferable that the spherical aberration characteristics have a plurality of peaks on both sides, plus and minus. Note here that only if the spherical aberration characteristics are permitted to have two or more peaks, the substantially constant MTF is achievable.

A numeral example for, and various characteristics, in Inventive Example 2 are now explained. In Inventive Example 2, Surface No. 5 (r5) of the third lens L3 in FIG. 2 is made up of a bifocal lens so that the substantially constant MTF is achieved at the position where the imaging device is located as well as in the predetermined distances before and after that position. The significances of various numerals, and various conditions are the same as explained with reference to Comparative Example 1 and Inventive Example 1.

Figure 7:
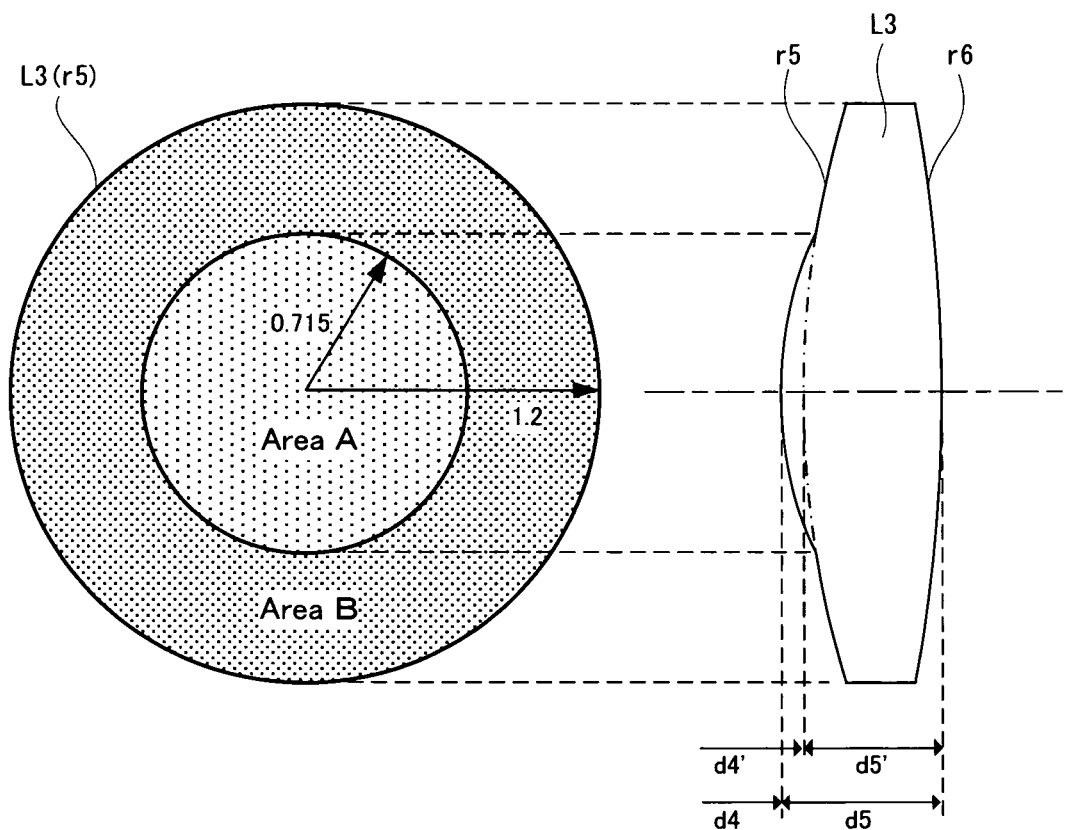
FIG. 7 is illustrative in schematic of the makeup of a bifocal lens used in Inventive Example 2.

FIG. 7 is a front view, and a sectional view as taken along the optical axis, of the bifocal lens used for Surface No. 5 (r5) of the third lens L3. This figure is provided in such a schematic form as to explain the multi-focal lens in an easy-to-understand way; its shape is different from the one defined by actual numerals.

As shown in FIG. 7, this bifocal lens is provided with an area A at its center, and an area B in such a way as to surround that area A. In the instant inventive example, the areas A and B each have a spherical shape and the area A is seamlessly contiguous to the area B with no step between them. The radius and curvature of each area and surface separations d4, d5 between the respective lens surfaces (optical surfaces) are set out in the following numeral example. As shown in FIG. 7, a virtual surface defined by the area B of the lens surface provides a surface separation at a position of intersection of it with the optical axis (d4, d5 in FIG. 7).

Numeral Example 2

| Unit mm | | | | | |
|---|---|---|---|---|---|
| Surface Data | | | | | |
| Surface No. | r | d | nd | Vd | F |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5(Bi-focal) | 10.7443 | 0.4438 | 1.81067 | 41.00 | 8.1189 |
| 6 | −6.5817 | 0.2367 | | | |
| 7(Stop) | ∞ | 7.7389 | | | |
| 8(Imaging Plane) | ∞ | | | | |

| Bi-focal Lens (Surface No. 5) | | | | |
|---|---|---|---|---|
| | Radius | Curvature | d4 | d5 |
| Area A | 0.715 | 10.7443 | 0.3997 | 0.4438 |
| Area B | 1.2 | 11.0443 | 0.4003 | 0.4432 |

| Various Data | |
|---|---|
| Focal Length | 9.9902 |
| F-number | 3.5 |

| Depth Characteristics (Estimation Spatial Frequency: 84[lp/mm]) | | |
|---|---|---|
| | Depth | Invention vs. Comparison [%] | Calculated F-Number |
| MTF20% | 0.16 | 177 | 6.2 |
| MTF10% | 0.19 | 175 | 6.1 |

Figure 8:
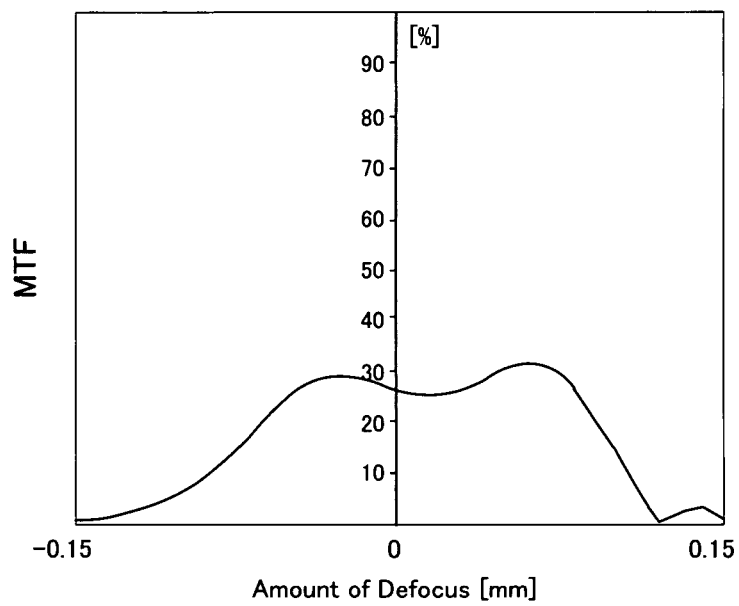
FIG. 8 is indicative of the MTF characteristics of the optical system in Inventive Example 2.

FIG. 8 is indicative of the axial MTF characteristics in Inventive Example 2. The estimation spatial frequency is set at 84 (lp/mm), as in Comparative Example 1. Even with the axial MTF characteristics shown in FIG. 8, the substantially constant MTF is achievable at the position where the amount of defocus is zero: the position where the imaging device is located and within the range of the predetermined distances before and after that position.

Figure 9:
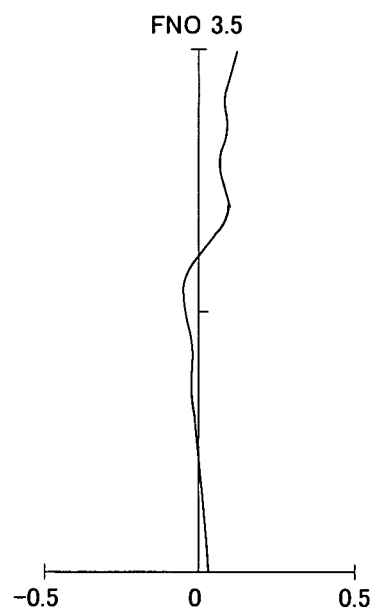
FIG. 9 is indicative of the spherical aberration characteristics in Inventive Example 2.

FIG. 9 is indicative of the spherical aberration characteristics in Inventive Example 2, here at a wavelength of 546.07 (nm) as in Comparative Example 1. The spherical aberration characteristics have some peak values on the plus and minus sides. In Inventive Example 2, too, the MTF remains substantially constant at the positions before and after the position where the amount of defocus becomes 0.

A numeral example for, and various characteristics, in Inventive Example 3 are now explained. As in Inventive Example 2, Surface No. 5 (r5) of the third lens L3 in FIG. 2 is made up of a bifocal lens so that the substantially constant MTF is achieved at the position where the imaging device is located and in the predetermined distances before and after that position. However, that bifocal lens is different from that in Inventive Example 2 in terms of details. The significances of various numerals, and various design conditions are the same as explained with reference to Comparative Example 1 and Inventive Examples 1 and 2.

Figure 10:
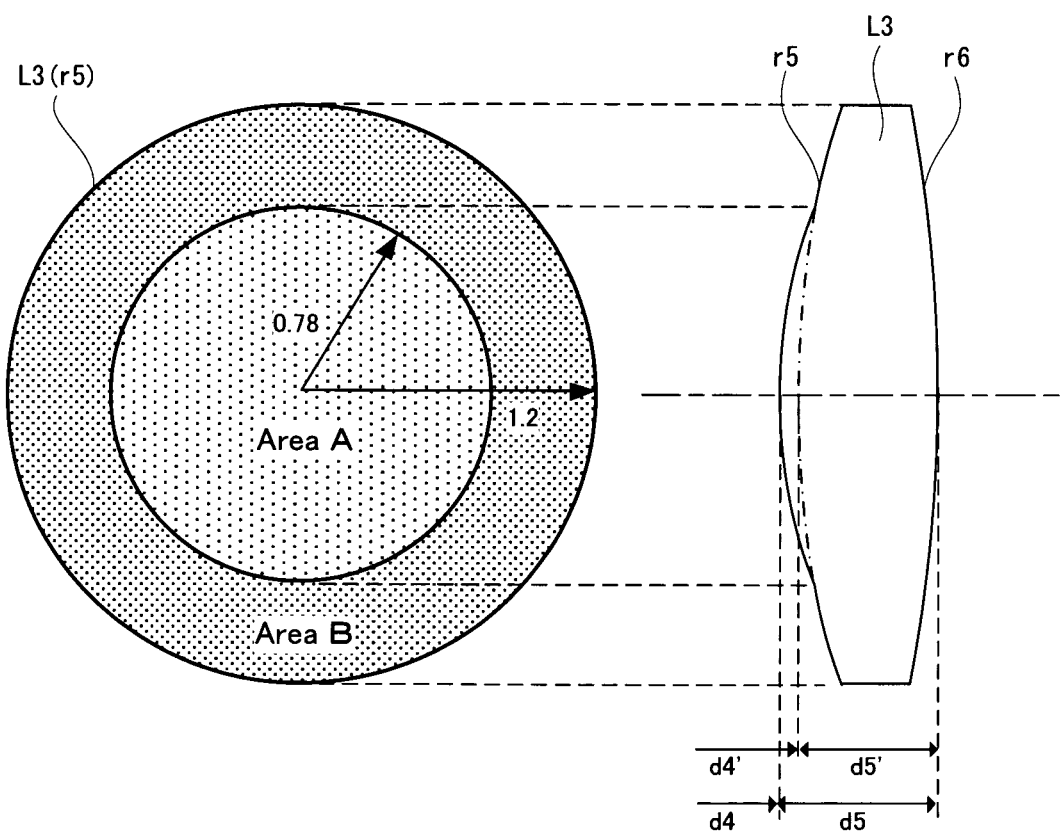
FIG. 10 is illustrative in schematic of the makeup of a bifocal lens used in Inventive Example 3.
Figure 11:
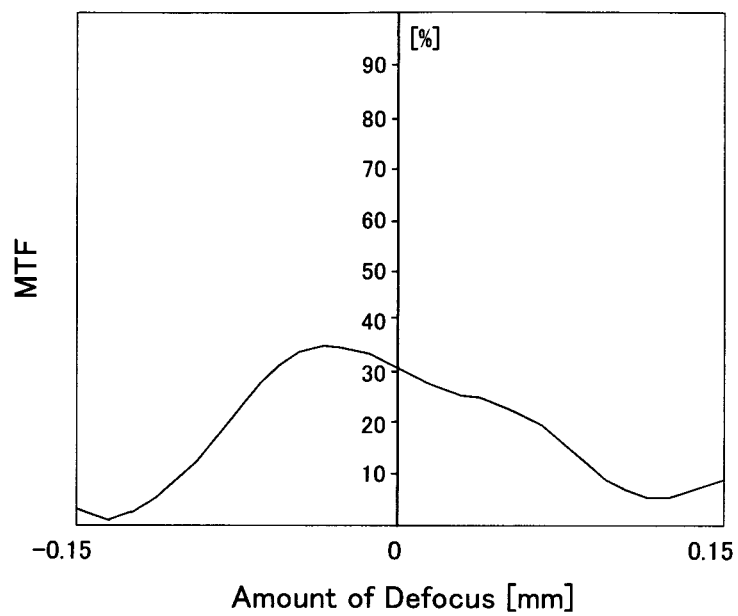
FIG. 11 is indicative of the MTF characteristics of the optical system in Inventive Example 3.

FIG. 10 is a front view, and a sectional view as taken along the optical axis, of the bifocal lens used for Surface No. 5 (r5) of the third lens L3. This figure is provided in such a schematic form as to explain the multi-focal lens in an easy-to-understand way; its shape is different from the one defined by actual numerals.

As shown in FIG. 10, that bifocal lens is provided with an area A at its center and an area B in such a way as to surround that area A. Inventive Example 3 is different from Inventive Example 2 in that the radius of the area A is larger as compared with Inventive Example 2. The radius and curvature of each area and the surface separations d4, d5 between the respective lens surfaces (optical surfaces) are set out in the following numeral example.

Numeral Example 3

| Unit mm | | | | | |
|---|---|---|---|---|---|
| Surface Data | | | | | |
| Surface No. | r | d | nd | Vd | F |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5(Bi-focal) | 10.7443 | 0.4438 | 1.81067 | 41.00 | 8.1189 |
| 6 | −6.5817 | 0.2367 | | | |
| 7(Stop) | ∞ | 7.7389 | | | |
| 8(Imaging Plane) | ∞ | | | | |

| Bi-focal Lens (Surface No. 5) | | | | |
|---|---|---|---|---|
| | Radius | Curvature | d4 | d5 |
| Area A | 0.78 | 10.7443 | 0.3997 | 0.4438 |
| Area B | 1.2 | 11.0443 | 0.4005 | 0.4430 |

-continued

Unit mm

Various Data

| | |
|---|---|
| Focal Length | 9.9902 |
| F-number | 3.5 |

Depth Characteristics
(Estimation Spatial Frequency: 84[lp/mm])

| | Depth | Invention vs. Comparison [%] | Calculated F-Number |
|---|---|---|---|
| MTF20% | 0.14 | 157 | 5.5 |
| MTF10% | 0.20 | 176 | 6.2 |

FIG. 11(a) is indicative of the axial MTF characteristics at the estimation spatial frequency of 84 (lp/mm) as in Comparative Example 1.

With such axial MTF characteristics shown in FIG. 11(a), too, the substantially constant MTF is achievable at the position where the amount of defocus is zero: the position where the imaging device is located and within the range of the predetermined distances before and after that position.

Figure 12:
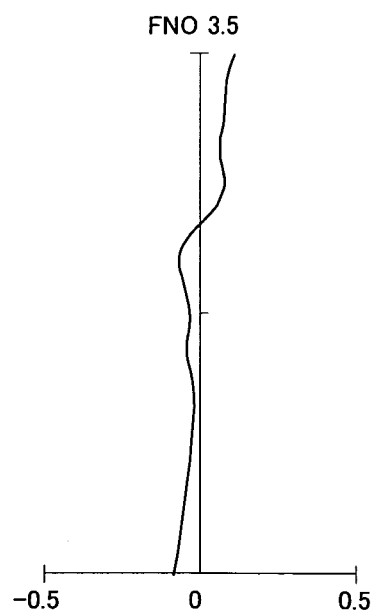
FIG. 12 is indicative of the spherical aberration characteristics in Inventive Example 3.

FIG. 12 is indicative of the spherical aberration characteristics in Inventive Example 3 at a wavelength of 546.07 (nm) as in Comparative Example 1. The spherical aberration characteristics have some peaks on plus and minus sides. Accordingly, in Inventive Example 3 too, the MTF remains substantially constant at positions before and after the position where the amount of defocus becomes 0.

A numeral example for, and various characteristics, in Inventive Example 4 are now explained. In Inventive Example 4, Surface No. 5 (r5) of the third lens L3 in FIG. 2 is configured as a trifocal lens so that the substantially constant MTF is achieved at the position where the imaging device is located and in the predetermined distances before and after that position. The significances of various numerals, and various design conditions are much the same as explained with reference to Comparative Example 1 and Inventive Examples 1-3.

Figure 13:
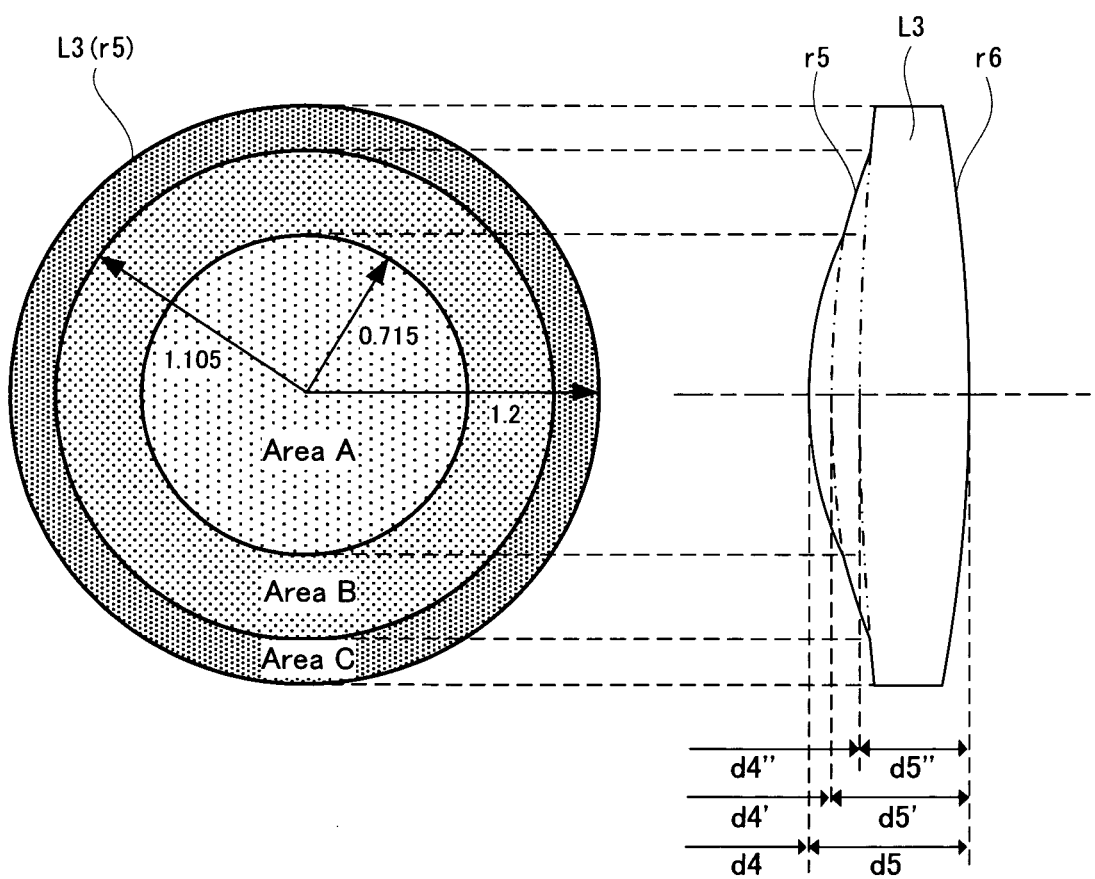
FIG. 13 is illustrative in schematic of the makeup of a trifocal lens used in Inventive Example 4.

FIG. 13 is a front view, and a sectional view as taken along the optical axis, of the trifocal lens used for Surface No. 5 (r5) of the third lens L3. This figure is provided in such a schematic form as to explain the multi-focal lens in an easy-to-understand way; its shape is different from the one defined by actual numerals.

As shown in FIG. 13, that trifocal lens is provided with an area A at its center, an area B in such a way as to surround that area A, and an area C in such a way as to surround that area B. In Inventive Example 4, the areas A, B and C are each in a spherical shape, and seamlessly contiguous to one another with no step between the adjacent areas. In the following numeral example, the radius and curvature of each area and surface separations d4, d5 between the respective lens surfaces (optical surfaces) are given. Note here that the surface separations d4, d5 of the area B refer to those at a position where a virtual surface defined by the lens surface of the area B crosses the optical axis (as shown at d4, d5 in FIG. 13), and the surface separations d4, d5 of the area C refer to those at a position where a virtual surface defined by the lens surface of the area C crosses the optical axis (as shown at d4, d5 in FIG. 13).

Numeral Example 4

Unit mm

Surface Data

| Surface No. | r | d | nd | Vd | F |
|---|---|---|---|---|---|
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5(Trifocal) | 10.7443 | 0.4438 | 1.81067 | 41.00 | 8.1189 |
| 6 | −6.5817 | 0.2367 | | | |
| 7(Stop) | ∞ | 7.7389 | | | |
| 8(撮像面) | ∞ | | | | |

Trifocal Lens (Surface No. 5)

| | Radius | Curvature | d4 | d5 |
|---|---|---|---|---|
| Area A | 0.715 | 10.7443 | 0.3997 | 0.4438 |
| Area B | 1.105 | 11.0443 | 0.4003 | 0.4432 |
| Area C | 1.2 | 11.2943 | 0.4025 | 0.4410 |

Various Data

| | |
|---|---|
| Focal Length | 9.9902 |
| F-number | 3.5 |

Depth Characteristics
(Estimation Spatial Frequency: 84[lp/mm])

| | Depth | Invention vs. Comparison [%] | Calculated F-Number |
|---|---|---|---|
| MTF20% | 0.17 | 184 | 6.5 |
| MTF10% | 0.22 | 195 | 6.8 |

Of Inventive Example 4 using such a trifocal lens, too, the MTF characteristics as well as the spherical aberration characteristics are given.

Figure 14:
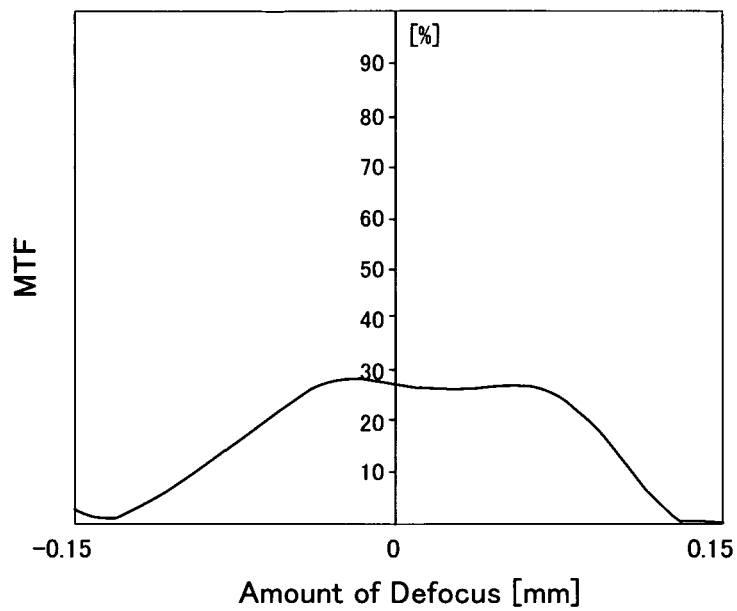
FIG. 14 is indicative of the MTF characteristics of the optical system in Inventive Example 4.
Figure 14:
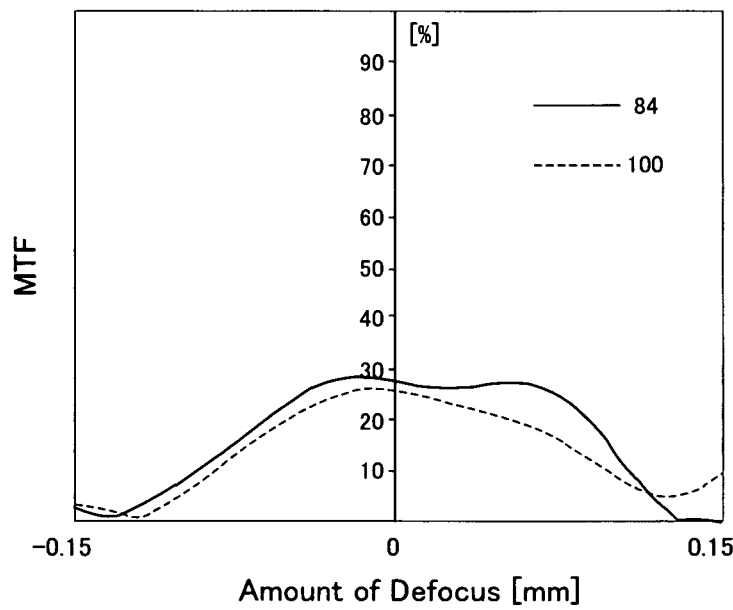

FIG. 14 is indicative of the axial MTF characteristics in FIG. 4: FIG. 14(a) is indicative of the axial MTF characteristics at the estimation spatial frequency of 84 (lp/mm) as in Comparative Example 1, and FIG. 14(c) is indicative of the MTF characteristics at a different estimation spatial frequency. Specifically, two sets of MTF characteristics at 84 (lp/mm) as in FIG. 14(a) and 100 (lp/trim) are shown.

As can be seen from the axial MTF characteristics shown in FIG. 14(a), the substantially constant MTF is again achieved at the position where the amount of defocus is zero: at the position where the imaging device is located and within the range of the predetermined distances before and after that position, and as can be seen from the MTF characteristics at 84 (lp/mm) shown in FIG. 14(c), the MTF characteristics at 84 (lp/mm) cross the MTF characteristics at the estimation spatial frequency of 100 (lp/mm) but not so much that contrast becomes zero. Such a state would make sure the MTF characteristics at 84 (lp/mm) remains substantially constant. In Inventive Example 4, that crossing is found at a position of 100 or less, which provides another evidence of making sure the MTF characteristics at 84 (lp/mm) remains substantially constant.

Figure 15:
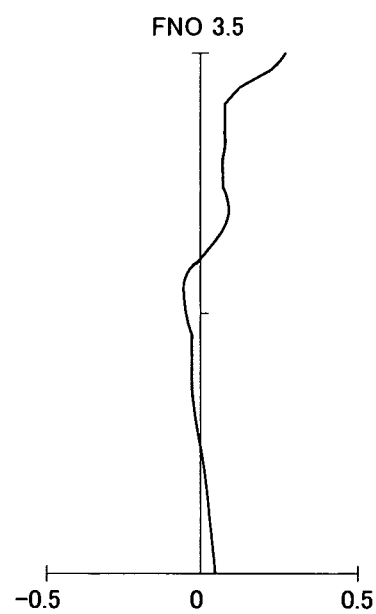
FIG. 15 is indicative of the spherical aberration characteristics in Inventive Example 4.

FIG. 15 is indicative of the spherical aberration characteristics in Inventive Example 4, here at a wavelength of 546.07 (nm) as in Comparative Example 1. The spherical aberration characteristics have some peaks on plus and minus sides. Accordingly, in Inventive Example 4 too, the MTF remains substantially constant at positions before and after the position where the amount of defocus becomes zero.

Figure 16:
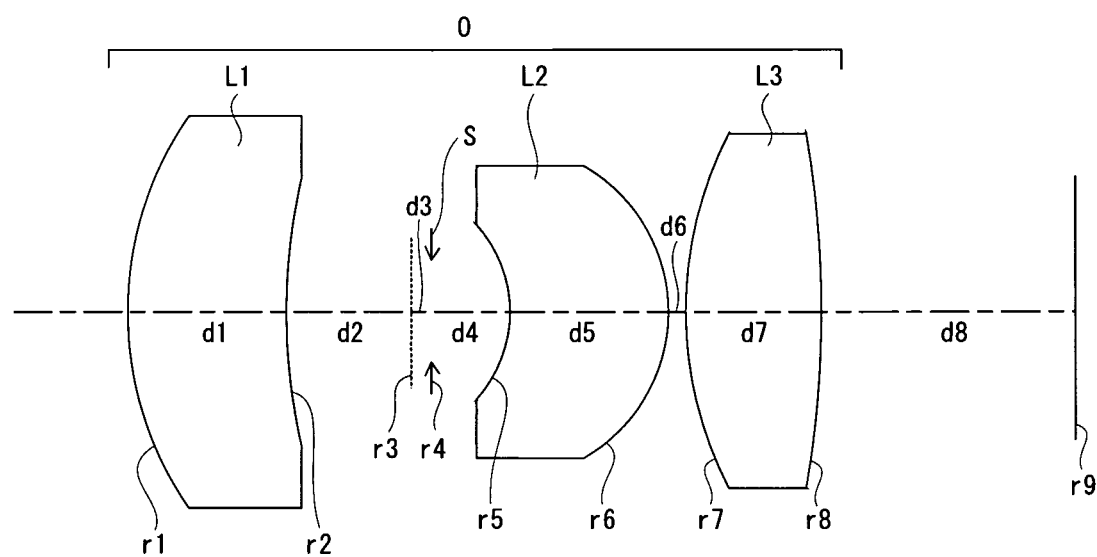
FIG. 16 is illustrative in section as taken apart along the optical axis of the optical system in Comparative Example 2.

Inventive Example 5 using another optical system is now explained with reference to its Comparative Example 2. FIG. 16 is a sectional view of the optical system used in Comparative Example 2, as taken apart along the optical axis.

An optical system O in Comparative Example 2 is built up of a first lens L1, an aperture stop S, a second lens L2 and a third lens L3, which are lined up from an object side toward an exit side thereof. In FIG. 16, a CCD or other imaging device is located on an imaging plane indicated at r9.

The first lens L1 is a single lens of positive meniscus shape convex on its object side; the second lens L2 is a single lens of positive meniscus shape concave on its object side; and the third lens L3 is a single lens of double-convex shape having positive refracting power. For the purpose of comparison with Inventive Example 5, the optical system O is designed such that a virtual surface r3 is located in front of the aperture stop S.

In Inventive Example 5, an imaging device having a maximum number of 353 pixels in the lengthwise or widthwise direction and a pixel pitch of 3.0 (μm) is presumed as the imaging device located on the imaging plane.

A numeral example for Comparative Example 2 is given below. The significances of various numerals are the same as explained with reference to Comparative Example 1 and Inventive Examples 1 to 4, and the estimation spatial frequency for the depth characteristics is supposed to be 111 (lp/mm).

Comparative Numeral Example 2

| Unit mm | | | | | |
|---|---|---|---|---|---|
| Surface Data | | | | | |
| Surface No. | r | d | nd | Vd | F |
| 1* | 1.0577 | 0.4200 | 1.59008 | 29.90 | 3.5608 |
| 2 | 1.8160 | 0.3820 | | | |
| 3 | ∞ | 0.0500 | | | |
| 4(Stop) | ∞ | 0.2020 | | | |
| 5 | −0.3626 | 0.4200 | 1.49380 | 57.40 | 4.1989 |
| 6* | −0.4268 | 0.0380 | | | |
| 7 | 1.1353 | 0.3530 | 1.69979 | 55.50 | 1.2981 |
| 8 | −3.9640 | 0.6686 | | | |
| 9(Imaging Plane) | ∞ | | | | |

Aspheric Data

1$^{st}$ Surface

K = 0
A2 = 0.00E+00
A4 = 1.58E−01
A6 = 0.00E+00
A8 = 0.00E+00
A10 = 0.00E+00

6$^{th}$ Surface

K = 0
A2 = 0.00E +00
A4 = 1.08E+00
A6 = −5.63E+00
A8 = 7.40E+01
A10 = 0.00E +00

-continued

| Unit mm |
|---|
| Various Data |

| Focal Length | 0.9971 |
|---|---|
| F-number | 2.8 |

Depth Characteristics
(Estimation Spatial Frequency: 111[lp/mm])

| | Depth |
|---|---|
| MTF20% | 0.06 |
| MTF10% | 0.07 |

Figure 17:
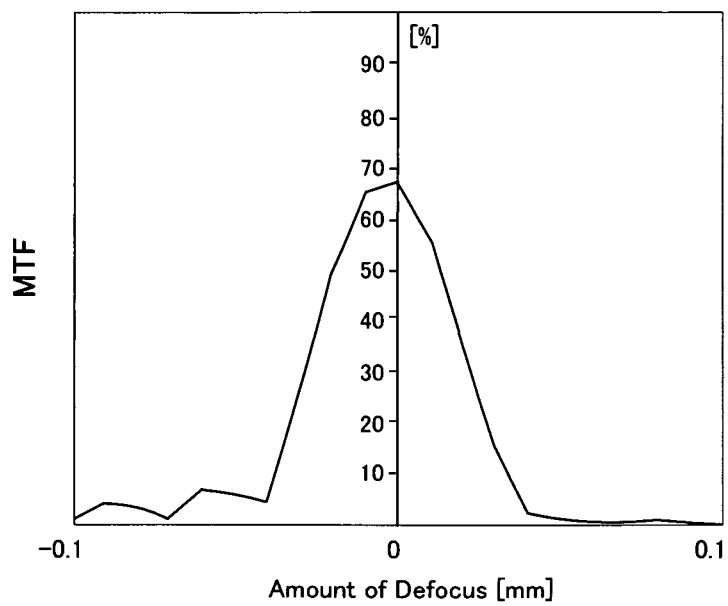
FIG. 17 is indicative of the MTF characteristics in Comparative Example 2.

FIG. 17 is indicative of the MTF characteristics at the estimation spatial frequency of 111 (lp/ram) in Comparative Example 2, indicating an MTF (in %) relative to the axial amount of defocus (given in mm). The MTF characteristics in this Comparative Example 2 have such a shape as to have a sharp peak value of approximately 65% near 0 (mm).

Figure 18:
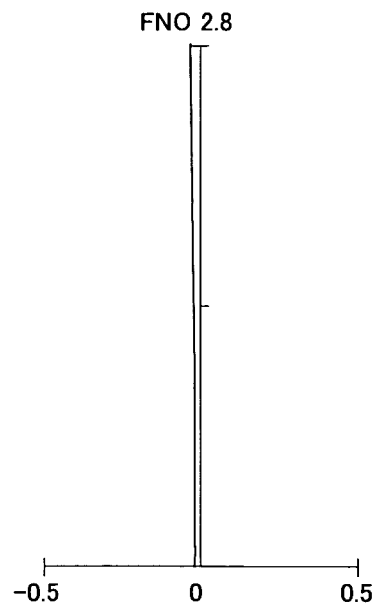
FIG. 18 is indicative of the spherical aberration characteristics in Comparative Example 2.

FIG. 18 is indicative of the spherical aberration characteristics in Comparative Example 2, here at a wavelength of 546.07 (mm). As can be seen from FIG. 18, there are less fluctuating spherical aberration characteristics.

Figure 19:
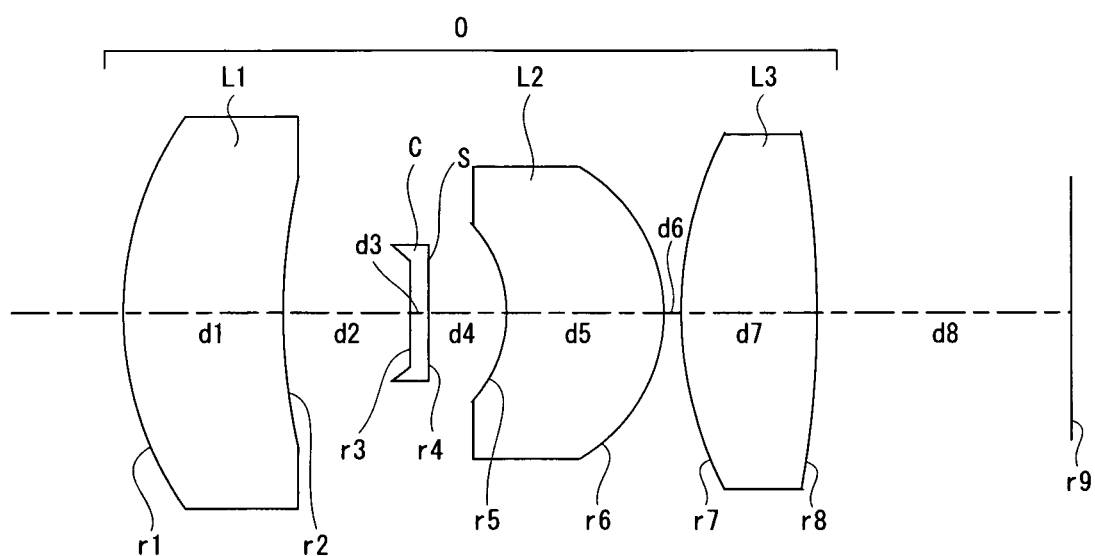
FIG. 19 is illustrative in section as taken along the optical axis of the taken-apart optical system in Inventive Example 5.

A numeral example for, and various characteristics in, Inventive Example 6 are now explained. FIG. 19 is a sectional view of the optical system in Inventive Example 5, as taken apart along the optical axis. In Inventive Example 5, an aspheric plate C is inserted between a virtual surface r3 and the aperture stop S in FIG. 16 so that the substantially constant MTF is achievable at the position where the imaging device is located and in the predetermined distances before and after that position. The significances of various numerals, and various design conditions are the same as explained with reference to Comparative Example 2.

Numeral Example 5

| Unit mm | | | | | |
|---|---|---|---|---|---|
| Surface Data | | | | | |
| Surface No. | r | d | nd | Vd | F |
| 1* | 1.0577 | 0.4200 | 1.59008 | 29.90 | 3.5608 |
| 2 | 1.8160 | 0.3820 | | | |
| 3* | ∞ | 0.0500 | 2.11986 | 36.80 | 11.0766 |
| 4(Stop) | ∞ | 0.2020 | | | |
| 5 | −0.3626 | 0.4200 | 1.49380 | 57.40 | 4.1989 |
| 6* | −0.4268 | 0.0380 | | | |
| 7 | 1.1353 | 0.3530 | 1.69979 | 55.50 | 1.2981 |
| 8 | −3.9640 | 0.6222 | | | |
| 9(Imaging Plane) | ∞ | | | | |

Aspheric Data

1$^{st}$ Surface

K = 0
A2 = 0.00E+00
A4 = 1.58E−01
A6 = 0.00E+00
A8 = 0.00E+00
A10 = 0.00E+00

3$^{rd}$ Surface

K = 0
A2 = 4.01E−02

-continued

Unit mm

A4 = −3.95E+00
A6 = 6.19E+02
A8 = −7.92E−01
A10 = −1.04E+06
$6^{th}$ Surface

K = 0
A2 = 0.00E+00
A4 = 1.08E+00
A6 = −5.63E+00
A8 = 7.40E+01
A10 = 0.00E+00

Various Data

| Focal Length | 0.9973 |
|---|---|
| F-number | 2.8 |

Depth Characteristics
(Estimation Spatial Frequency: 111[lp/mm])

| | Depth | Invention vs. Comparison [%] | Calculated F-Number |
|---|---|---|---|
| MTF20% | 0.09 | 159 | 4.4 |
| MTF10% | 0.11 | 158 | 4.4 |

Figure 20:
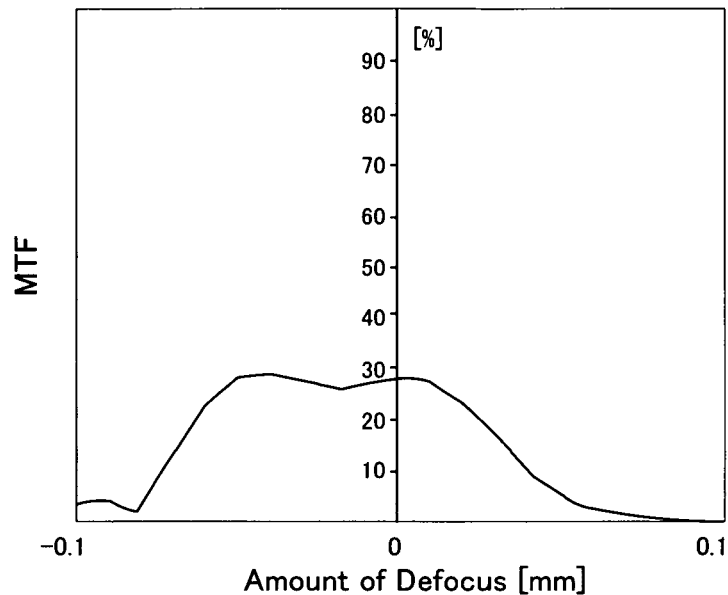
FIG. 20 is indicative of the MTF characteristics of the optical system in Inventive Example 5.
Figure 20:
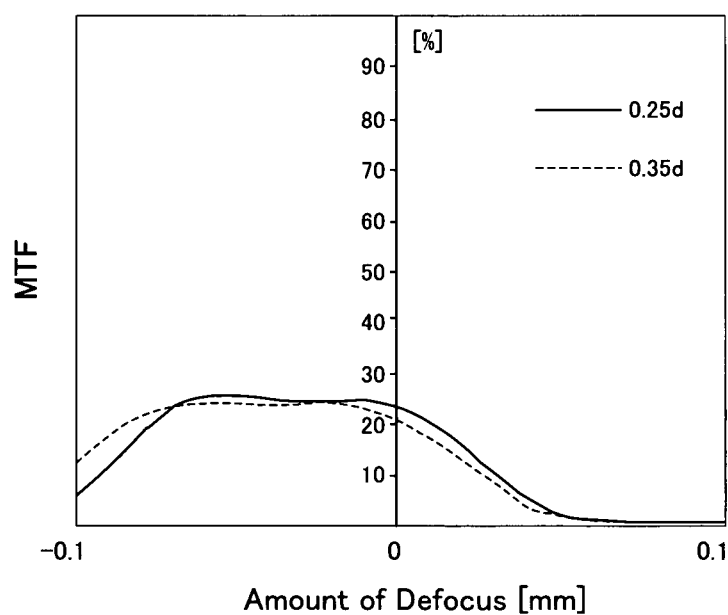

FIG. 20 is indicative of the MTF characteristics in Inventive Example 5: FIG. 20(*a*) is indicative of the axial MTF characteristics, and FIG. 20(*b*) is indicative of the off-axis MTF characteristics, here two sets of off-axis MTF characteristics at 0.25d and 0.35 where 0.5d is the maximum height of the imaging plane. The estimation spatial frequency for both FIGS. 20(*a*) and 20(*b*) is supposed to be 111 (lp/mm).

As can be seen from the axial MTF characteristics indicated in FIG. 20(*a*) and from a comparison with the MTF characteristics of Comparative Example 2 in FIG. 17, the substantially constant, if low, MTF is achievable at the position where the amount of defocus is zero: at the position where the imaging device is located and in the range of the predetermined distances before and after that position.

As can be seen from FIG. 20(*b*), the off-axis, substantially constant MTF characteristics are achievable as is the case with the axial characteristics.

Figure 21:
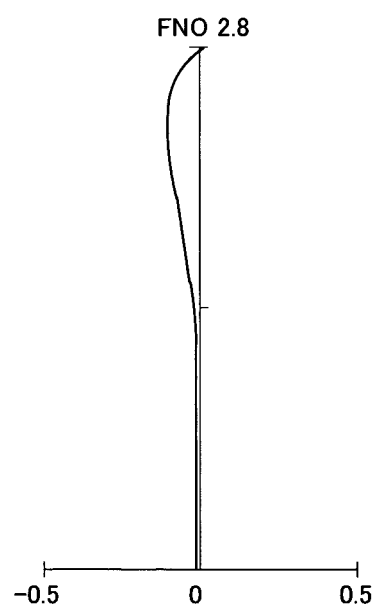
FIG. 21 is indicative of the spherical aberration characteristics in Inventive Example 5.

FIG. 21 is indicative of the spherical aberration characteristics in Inventive Example 5, here at a wavelength of 546.07 (nm). The spherical aberration characteristics are much more susceptible of fluctuation about two peak values on the minus side than those in FIG. 18.

Thus, the fluctuation of the spherical aberration characteristics makes it possible to achieve the substantially constant MTF near the position where the amount of defocus is zero.

While Inventive Examples 1 to 4 and their Comparative Example 1 have been explained with reference to FIGS. 2 to 15 and Inventive Example 5 and its Comparative Example 2 have been explained with reference to FIGS. 16 to 21, it is to be understood that according to the optical systems in such Inventive Examples 1 to 5, the substantially constant MTF is achieved at the position where the amount of defocus becomes zero: the position where the imaging device is located and in the predetermined distances before and after that position. When an image is obtained through such optical systems, an image having sufficient resolution may be obtained by applying image restoration processing to it. It is also possible to obtain an image having a wide depth of focus.

It is here to be noted that Comparative Example 1 is different from Inventive Example 1 in that the aspheric shape is provided, from Inventive Examples 2 and 3 in that the bifocal lens is provided, and from Inventive Example 4 in that the trifocal lens is provided, all for the purpose of achieving the substantially constant MTF. It is also to be noted that the wavefront control device used to achieve the substantially constant MTF may include not only an aspheric lens shape, a multi-focal lens and an aspheric plate but also a phase plate. It is also acceptable to relay upon a plurality of wavefront control devices. Although the areas of the multi-focal lens are each defined by a spherical shape in Inventive Examples 2 to 4, it is to be understood that any one of the areas may be configured as an aspheric shape. Otherwise, the substantially constant MTF may be achieved using a doubly refracting crystal for the material of the wavefront control device.

The wavefront control device for achieving the substantially constant MTF may be designed to be detachable. If doing so, it may be used as an ordinary optical system (Comparative Examples 1 and 2) having sharp MTF characteristics. For instance in Inventive Examples 1 to 4, if the third lens L3 is replaced by it, there will be the optical system of Comparative Example 1 obtained, and in Inventive Example 5, if the aspheric plate C is removed, there will be the optical system of Comparative Example 2 obtained.

Tabulated below are the values of Conditions (1-1) to (2-7) in Inventive Examples 1 to 5. Note here that these values are obtained at a=20 and b=10. For Inventive Examples 1 and 2, two sets of off-axis data at 0.25d and 0.35d where 0.5d is the maximum height of the imaging plane) are also tabulated.

| | Ex. 1 | Ex. 2 | Ex. 3 | Ex. 4 | Ex. 5 |
|---|---|---|---|---|---|
| Condition (1-1) | 84 | 84 | 84 | 84 | 111 |
| Condition (1-2) | 84 | 84 | 84 | 84 | 111 |
| Condition (1-3) | 0.021 | 0.021 | 0.021 | 0.021 | 0.314 |
| Condition (2-1) | 0.66 | 0.82 | 0.72 | 0.77 | 0.77 |
| Condition (2-2) | 1.34 | 1.25 | — | 1.08 | 1.10 |
| Condition (2-3) | 1.01 | 1.16 | 1.23 | 1.08 | 1.08 |
| Condition (2-4) | 0.73 | 0.89 | 0.90 | 0.91 | 0.93 |
| Condition (2-5) | 84 | 84 | 84 | 84 | 111 |
| Condition (2-6) | 84 | 84 | 84 | 84 | 111 |
| Condition (2-7) | 0.021 | 0.021 | 0.021 | 0.02 | 0.314 |

Off-Axis Data

| | (0.25d) | (0.35d) |
|---|---|---|
| | Ex. 1 | |
| Condition (2-1) | 0.25 | 0.25 |
| Condition (2-2) | 1.20 | 1.16 |
| Condition (2-3) | 1.10 | 1.17 |
| Condition (2-4) | 0.21 | 0.22 |
| Condition (2-5) | 84 | 84 |
| Condition (2-6) | 84 | 84 |
| Condition (2-7) | 0.021 | 0.021 |
| | Ex. 5 | |
| Condition (2-1) | 0.72 | 0.715 |
| Condition (2-2) | 1.16 | 1.10 |
| Condition (2-3) | 1.12 | 1.10 |
| Condition (2-4) | 0.82 | 0.80 |
| Condition (2-5) | 111 | 111 |
| Condition (2-6) | 111 | 111 |
| Condition (2-7) | 0.314 | 0.314 |

Figure 22:
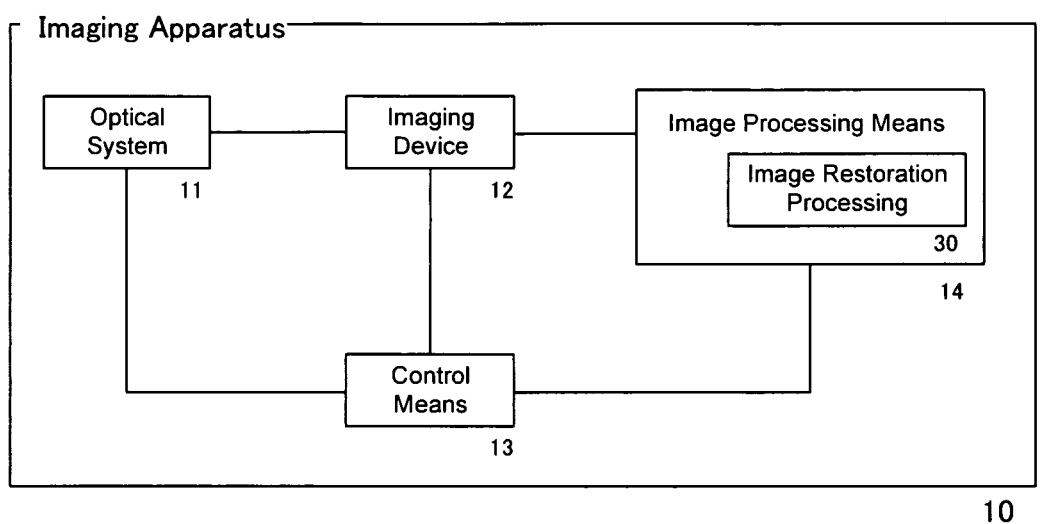
FIG. 22 is illustrative in schematic of the makeup of the inventive imaging apparatus.
Figure 23:
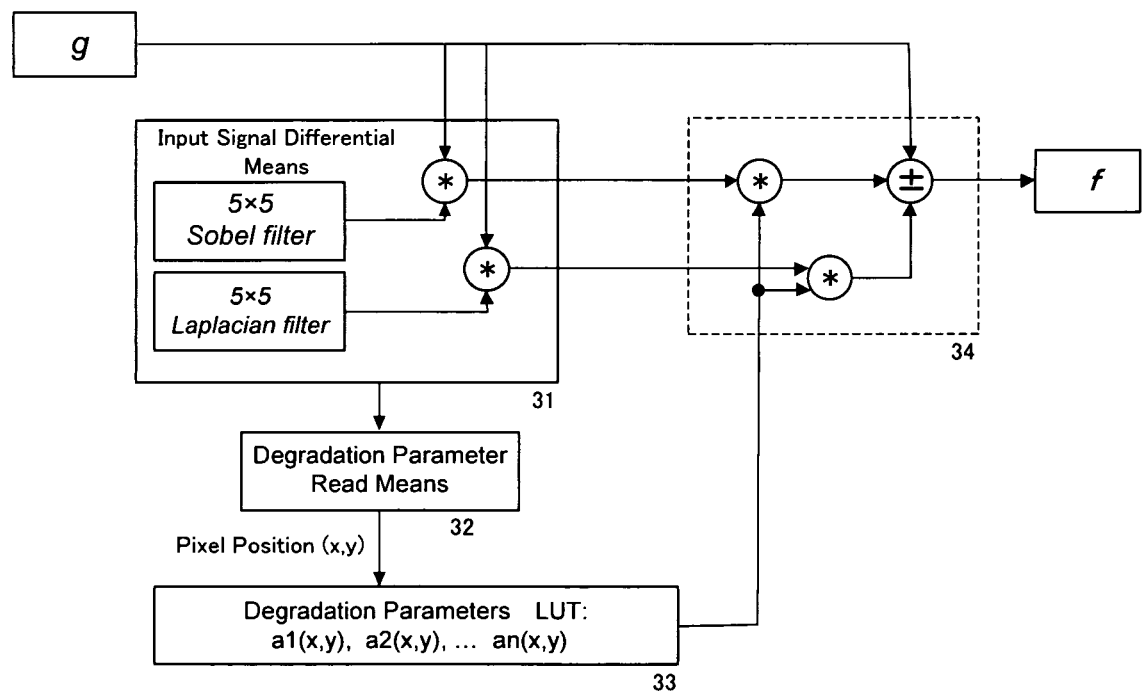
FIG. 23 is illustrative in schematic of the inventive image restoration processing.

The inventive imaging apparatus and imaging system are now explained with reference to FIGS. 22, 23 and 24. FIG. 22 is illustrative in schematic of the makeup of the inventive imaging apparatus. This imaging apparatus is made up of an optical system 11, an imaging device 12, an image processing means 14 and a control means 13. Note here that while image restoration processing 30 is supposed to be implemented by the image processing means 14, this image restoration processing 30 may be performed outside the imaging apparatus 30.

In this imaging apparatus 10, the optical system 11 has the substantially constant MTF at the position where the imaging device 12 is located and in the predetermined distances before and after that position, as explained so far. Light from a subject is collected at the optical system 11 to form a subject image on the collection position. And there is the imaging device 12 like a CCD located at the collection position. The imaging device 12 is formed by an array of orderly lined-up photoelectric elements (pixels).

A light beam incident on the imaging device 12 is transformed by the photoelectric elements of the imaging device 12 into electric signals (image signals) which are in turn entered into the image processing means 14, where they are subjected to various signal processings such as development processing, gamma correction, image compression processing, and image restoration processing 30. Electric signals subjected to signal processing are then sent out to an external memory or add-on via a built-in memory and various interfaces, not shown, within the imaging apparatus 10.

The control means 13 has control over the optical system 11, imaging device 12 and image processing means 14. The control means 13 is made up of storage means such as CPUs, ROMs and RAMs and various programs stored in the storage means. The control means 13 may serve also as the image processing means.

The imaging restoration processing 30 runs on the basis of the imaging characteristic of the optical system 11. Specifically, the control means 13 acquires information about the imaging characteristic of the optical system 11, and delivers it to the image restoration processing 30 so that even with the imaging apparatus 10 having the replaceable optical system 11, there can be the image restoration processing 30 implemented in such a way as to be compatible with the optical system 11. For the imaging characteristic of the optical system 11, not only is information specifically indicative of imaging characteristic such as aperture values and focal lengths used, but identification information on the optical system 11 such as the manufacturer s serial numbers is also used. Then, that information may be converted at the control means 13 into actual imaging characteristic corresponding to the identification information.

The image restoration processing in the imaging apparatus here is now explained. Note here that the image (obtained at the imaging device), to which the image restoration processing is applied, will be called the image being viewed. Although a variety of processings (transformations) may be utilized for image restoration processing, the image processing available here is roughly broken down into the following Classes 1, 2 and 3.

Class 1

The imaging characteristic of the optical system 11 is utilized, and processing matching with the position of the image being viewed is implemented.

Class 2

The imaging characteristic of the optical system 11 is utilized, and invariable processing is applied to all over the image being viewed.

Class 3

Invariable processing is applied to all over the image being viewed, without recourse to the imaging characteristic of the optical system 11.

According to the imaging restoration processing classified as Class 1, there is the so-called space variant processing implemented, wherein the processing applied varies for each pixel of the image being viewed. By this image processing, the image taken through the inventive optical system 11 can very effectively be restored. More specifically, it is possible to provide a substantially uniform rising of MTF at and near the position where the imaging device 12 is located. Details of this image restoration processing will be described. Note here that the processing applied may vary for each pixel group, not for each pixel.

According to the image restoration processing classified as Class 2, and 3, there is the so-called space invariant processing implemented, wherein the same processing is implemented for each pixel of the image being viewed. With such image restoration processing classified as Class 2, the image being viewed is filtered by an inverse function of the degradation function matching with the imaging characteristic of the optical system 11 so that effective image restoration can be implemented.

The image restoration processing classified as Class 3 includes band enhancement for boosting of a given band, edge enhancement for addition of edge information extracted out of the image being viewed, etc. According to these image restoration processings, image restoration may be implemented in a simple way without recourse to the imaging characteristic of the optical system 11. These image restoration processings (2) and (3) may be implemented either on a space or on a frequency axis using Fourier transformation or the like.

Image restoration processing classified as Class 1 is now explained in details.

As a subject having a continuously changing depth is taken, it causes the image being viewed to vary from front to back in terms of blurring. Suppose here that focus is on the center of the subject. The amount of blurring of the image of the subject being viewed will change with the preservation of "large→small→large" continuity. Such an event may be defined as a state where the blurring of each pixel of the image being view fluctuates depending on the coordinate position of the image being viewed: the so-called space variant state.

First of all, as the restored image is defined as f(x, y), the image being viewed as g(x, y) and the degradation function as h(x, y, α, β), $m^{th}$ and $n^{th}$ differentials about x, y of f(x, y) and g(x, y) and $i^{th}$, $k^{th}$ moments of h(x, y, α, β) may be defined by the following equations grouped as a set of Equations 1. Note here that the degradation function h(x, y, α, β) is indicative of the amount of blurring that changes depending on the pixel position of the image being viewed g(x, y) and PSF (α, β) indicative of the imaging characteristic of the optical system.

$$f^{(m,n)} = \frac{\partial^m}{\partial x^m}\frac{\partial^n}{\partial y^n}f(x, y)$$

$$g^{(m,n)} = \frac{\partial^m}{\partial x^m}\frac{\partial^n}{\partial y^n}g(x, y)$$

$$h_{i,k}^{(m,n)} = \int\int \alpha^i \beta^k \frac{\partial^m}{\partial x^m}\frac{\partial^n}{\partial y^n}h(x, y, \alpha, \beta)d\alpha d\beta$$

Equations 1

As relations between the image g being viewed, the restored image f and the degradation function h are modeled, they may be expressed by a convolution integral of h and f, as described below.

$$g(x, y) = \int_{-\infty}^{\infty}\int_{-\infty}^{\infty} h(x-\alpha, y-\beta, \alpha, \beta)f(x-\alpha, y-\beta)d\alpha d\beta$$

Equation 2

In Equation (2), the right side h and f are expanded according to Taylor expansion (h: truncated at the $n^{th}$ order, and f: truncated at the $m^{th}$ order), $$f(x-\alpha, y-\beta) = \sum_{n=0}^{N} a_n \sum_{i=0}^{n} C_i^n \alpha^{n-i} \beta^i f^{(n-i,i)}$$

$$h(x-\alpha, y-\beta, \alpha, \beta) = \sum_{m=0}^{M} a_m \sum_{j=0}^{m} C_j^m \alpha^{m-j} \beta^j h^{(m-j,j)}$$

$$C_p^k = \frac{k!}{p!(k-p)!}$$

Equations 3

As Equations 3 are substituted for Equation 2 and expressed by an integral of each term derived from the product of h and f, the term for each integral may be replaced by the moment of h defined by Equations 1 so that Equation 4 can be derived.

$$g(x,y) = \sum_{n=0}^{N} a_n \sum_{i=0}^{n} C_i^n f^{(n-i,i)} \sum_{m=0}^{M} a_m \sum_{j=0}^{m} C_j^m h_{m+n-i-j,i+j}^{(m-j,j)}$$

Equation 4

Both sides of Equation 4 are differentiated with respect to x, y. When a differential coefficient with respect to f, h>N, M, this is repeated p, q times with respect to x, y until $g^{(p,q)}=f^{(p,q)}$, with the proviso that each differential coefficient is set at 0, and then counted back for substitution for the differential value of f in Equation 4. Through such a procedure, there is only the $0^{th}$ differential term remaining as the function of f in Equation (4); the restored image f may be expressed by the multiply and accumulation of the restored image g and degradation function f as described below.

$$f(x,y)=g(x,y)+a_1(x,y)\cdot g(x,y)+ \ldots +a_n(x,y)\cdot g^{(n)}(x,y)$$

where f is the restored image, g is the image being viewed, $a_1$, $a_2$, ... $a_n$ are degradation parameters, and $g^{(n)}$ is an $n^{th}$ differential with respect to the image being viewed.

The degradation parameter here is determined by the degradation function h, and changes depending on the pixel position of the image g being viewed (x, y), and the imaging characteristic of the optical system.

In the inventive imaging apparatus, the image restoration processing classified as Class 1, wherein the image characteristic of the optical system 11 is utilized and transformation is implemented depending on the position of the image being viewed, is applied to the image being viewed. That is, if a subject image is taken by the optical system having the substantially constant MTF at the position where the imaging device is located and in the predetermined distances before and after that position and the image processing classified as Class 1 is applied to the image being viewed, it is possible to restore the resolution of the image (obtain a fully restored image) more effectively than could be achieved with the image restoration processings classified as Classes 2, 3.

One exemplary image restoration processing 30 is now explained with reference to FIG. 23. FIG. 23 is a block diagram for the imaging restoration processing 30 which, in the embodiment here, is constructed of an input signal differential means 31, a degradation parameter read means 32, a degradation parameter lookup table 33 and a multiply and addition means 34.

The input signal differential means 31 differentiates the image g being viewed using two filters, one being a Sobel filter for implementing the $1^{st}$ differential and the other being a Laplacian filter for implementing the $2^{nd}$ differential.

The degradation parameter lookup table 33 has the degradation parameters $a_1$, $a_2$, ... $a_n$ already stored in it, said degradation parameters matching with the pixel position (x, y) of the image g being viewed as well as the optical characteristics of the optical system 11. Thus, the provision in advance of the lookup table based on the design values of the optical system 11 in the inventive imaging apparatus helps curtail calculation time. Note here that when the Sobel and Laplacian filters are used, the degradation parameters $a_3$ to $a_n$ may be dispensed with because the parameters needed to be read out of the degradation parameter lookup table 33 are only $a_1$ and $a_2$.

Instead of having such lookup table 33 on hand, the degradation parameters may be acquired by real-time computation from the optical characteristics or selective use of a plurality of approximate expressions along the optical characteristics.

The degradation parameter read means 32 reads a value matching with the pixel position (x, y) out of the degradation parameter lookup table 33, and sends it out to the multiply and addition means 34.

The multiply and addition means 34 multiplies and adds the signals produced out of the input signal differential means 31 and the read degradation parameters with the addition of the image g being viewed, thereby producing the restored image f.

Figure 24:
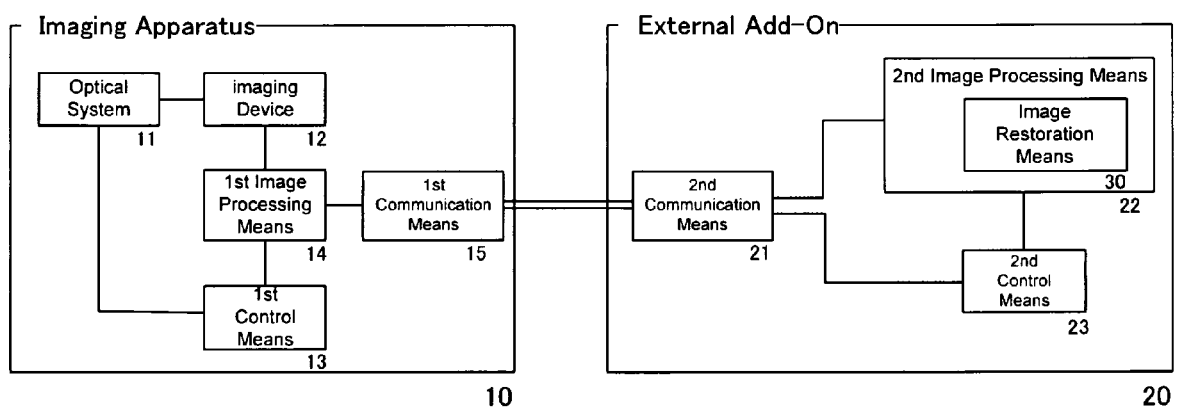
FIG. 24 is illustrative in schematic of the makeup of the inventive imaging system.

FIG. 24 is illustrative in schematic of the makeup of the imaging apparatus 10 as well as the makeup of the imaging system comprising that imaging apparatus 10 and an external add-on 20 in the case where the image restoration processing is implemented by the external add-on. In this case, the image restoration processing 30 is implemented by the external add-on 20.

The imaging apparatus 10 comprises an optical system 11, an imaging device 12, a first image processing means 14 and a first control means 13, each having the same makeup as explained with reference to the same numerals in FIG. 22. The imaging apparatus here is further provided with a first communication means 15. This first communication means 15 transmits an image (being viewed) taken at the imaging apparatus 10 to the external add-on 20. When the imaging characteristic of the optical system 11 is necessary for the image restoration processing 30 implemented at the external add-on 20, transmission may be implemented such that the imaging characteristic matches with the image being viewed.

On the other hand, the external add-on 20 is provided with a second communication means 21, a second image restoration means 22 that enables the image restoration processing 30, and a second control means 23. The second communication means 21 is provided to receive an image transmitted out of the first communication means 15. These first and second communication means 15 and 21 may run either via wires or wirelessly.

At the image processing means 22, the image restoration processing 30 is implemented depending on the image being viewed, which is received via the second communication means 21 or the image being viewed and the imaging characteristic. The image having the image restoration processing 30 applied to it is sent out to an external memory or other external add-on via an internal memory and various interfaces (not shown). Note here that at the second image processing means 22, just only the image restoration processing 30 but also other various image processings may be implemented.

Thus, the image restoration processing 30 is implemented by the external add-on 20 so that processing loads within the imaging apparatus 10 can be reduced. In the imaging apparatus here, while exchanges of various pieces of information such as the image being viewed are supposed to be made by the communication means 15 and 21, it is to be understood that exchanges of various pieces of information may be made via external memories detachably attached to the imaging apparatus 10 and external add-on 20.

In the foregoing, the inventive imaging apparatus and imaging system have been described; however, they may be applied not only to general digital cameras (irrespective of OVF or EVF) but also to endoscopes that are employed in the medical field, specifically for insertion through the body for viewing, capsule endoscopes that are swallowed down by patients for viewing their organs, or various optical apparatus such as microscopes.

While the present invention has been described with reference to numerous embodiments, it is to be understood that the invention is never limited to them, and as a matter of course, combinations of these embodiments are also embraced in the category of the invention.

The invention claimed is:

1. An imaging apparatus, comprising:
an imaging device;
an optical system for forming a subject image on said imaging device; and
an image processing means for implementing image processing for an image being viewed, said image produced out of said imaging device,
wherein said optical system has a substantially constant MTF at a position where said imaging device is located and in predetermined distances before and after said position, and
said substantially constant MTF has a spatial frequency that satisfies the following condition:

$\nu=1/(2\times P\times A)$, $1<A<20$, where $\nu$ is the spatial frequency, and P is a pixel pitch of the imaging device.

2. The imaging apparatus according to claim 1, characterized in that said optical system has said substantially constant MTF at a minimum F-number.

3. The imaging apparatus according to claim 1, characterized in that said substantially constant MTF crosses an MTF of other spatial frequency but not so much that contrast becomes zero.

4. The imaging apparatus according to claim 3, characterized in that said substantially constant MTF crosses the MTF of other spatial frequency at a 10% or less position.

5. The imaging apparatus according to claim 1, characterized in that spherical aberration characteristics of said optical system have a peak.

6. The imaging apparatus according to claim 5, characterized in that the spherical aberration characteristics of said optical system have two or more peaks.

7. The imaging apparatus according to claim 6, characterized in that the peaks of said spherical aberration characteristics are positioned on a plus side and a minus side.

8. The imaging apparatus according to claim 1, characterized in that said optical system comprises a wavefront control device for achieving said substantially constant MTF.

9. The imaging apparatus according to claim 8, characterized in that the wavefront control device for achieving said substantially constant MTF has an aspheric surface.

10. The imaging apparatus according to claim 8, characterized in that the wavefront control device for achieving said substantially constant MTF is a phase plate.

11. The imaging apparatus according to claim 8, characterized in that the wavefront control device for achieving said substantially constant MTF is a lens having a plurality of curvatures on one surface.

12. The imaging apparatus according to claim 11, characterized in that the wavefront control device for achieving said substantially constant MTF is a lens having different curvatures at its center and its periphery.

13. The imaging apparatus according to claim 11, characterized in that the wavefront control device for achieving said substantially constant MTF is a lens having three curvatures on one plane.

14. The imaging apparatus according to claim 11, characterized in that the wavefront control device for achieving said substantially constant MTF is formed of a material for which a doubly refracting crystal is used.

15. The imaging apparatus according to claim 8, characterized in that the wavefront control device for achieving said substantially constant MTF is detachable.

16. The imaging apparatus according to claim 1, characterized in that image processing implemented at said image processing means includes image restoration processing that is applied to an image being viewed, said image produced out of said imaging device.

17. The imaging apparatus according to claim 16, characterized in that said image restoration processing makes use of imaging characteristic of said optical system.

18. An imaging system, characterized by comprising:
an imaging apparatus as recited in claim 1; and
an external add-on for implementing image restoration processing for an image being viewed, said image taken at said imaging apparatus.

19. The imaging system according to claim 18, characterized in that said image restoration processing makes use of image characteristic of said optical system.

20. The imaging system according to claim 18, characterized in that said imaging apparatus and said external add-on each comprise a communication means, via which the image being viewed, said image taken at said imaging apparatus, is transmitted to said external add-on.

21. An imaging apparatus, comprising:
an imaging device;
an optical system for forming a subject image on said imaging device; and
an image processing means for implementing image processing for an image being viewed, said image produced out of said imaging device,
wherein said optical system has a substantially constant MTF at a position where said imaging device is located and in predetermined distances before and after said position, and
said substantially constant MTF has a spatial frequency that satisfies the following condition:

$\nu=1/(2\times P\times A)$, $2<A<8$, where $\nu$ is the spatial frequency, and P is a pixel pitch of the imaging device.

22. An imaging apparatus, comprising:
an imaging device;
an optical system for forming a subject image on said imaging device; and
an image processing means for implementing image processing for an image being viewed, said image produced out of said imaging device, wherein said optical system has a substantially constant MTF at a position where said imaging device is located and in predetermined distances before and after said position, and said substantially constant MTF has a spatial frequency that satisfies the following condition:

$$0.001 < v/N < 3,$$

where v is the spatial frequency, and N is the number of pixels on one side of the imaging device.

23. An imaging apparatus, comprising:
an imaging device;
an optical system for forming a subject image on said imaging device; and
an image processing means for implementing image processing for an image being viewed, said image produced out of said imaging device,
wherein said optical system has a substantially constant MTF at a position where said imaging device is located and in predetermined distances before and after said position,
said image processing implemented at said image processing means includes image restoration processing that is applied to an image being viewed, said image produced out of said imaging device,
said image restoration processing makes use of imaging characteristic of said optical system, and
said image restoration processing implements processing in which a restored image is represented by the following differential equation:

$$f(x,y)=g(x,y)+a_1(x,y) \cdot g(x,y)+ \ldots +a_n(x,y) \cdot g^{(n)}(x,y),$$

where f is the restored image, g is the image being viewed, $a_1, a_2, \ldots a_n$ are degradation parameters, and $g^{(n)}$ is an $n^{th}$ differential with respect to the image being viewed.

24. An imaging apparatus, comprising:
an imaging device;
an optical system for forming a subject image on said imaging device;
an image processing means for implementing image processing for an image being viewed, said image produced out of said imaging device; and
an external add-on for implementing image restoration processing for an image being viewed, said image taken at said imaging apparatus,
wherein said optical system has a substantially constant MTF at a position where said imaging device is located and in predetermined distances before and after said position, and
said image restoration processing implements processing in which a restored image is represented by the following differential equation:

$$f(x,y)=g(x,y)+a_1(x,y) \cdot g(x,y)+ \ldots +a_n(x,y) \cdot g^{(n)}(x,y),$$

where f is the restored image, g is the image being viewed, $a_1, a_2, \ldots a_n$ are degradation parameters, and $g^{(n)}$ is an $n^{th}$ differential with respect to the image being viewed.

25. An optical apparatus for forming a subject image on an imaging device and implementing image restoration processing for an image obtained at said imaging device, characterized by having an MTF that satisfies the following condition:

$$0.1 \le La/Lb \le 1, 10 < a < 30, 5 < b < 20,$$

where La is an MTF width at an a % MTF, and Lb is an MTF width at a b % MTF.

26. The optical apparatus according to claim 25, characterized in that said MTF satisfies the following condition:

$$1 \le MTF\_H/MTF\_L \le 2,$$

where MTF_H is a maximum peak value of MTF, and MTF_L is a minimum bottom value of MTF.

27. The optical apparatus according to claim 25, characterized in that said MTF satisfies the following condition: Condition (3):

$$1 \le MTF\_H/MTF\_ave \le 1.7,$$

where MTF_H is the maximum peak value of MTF, and MTF_ave is an average value of MTF within an La range.

28. The optical apparatus according to claim 25, characterized in that said MTF satisfies the following condition:

$$0.2 \le La/Lc \le 1.2,$$

where Lc is a half bandwidth of MTF.

29. An imaging apparatus, comprising:
an imaging device;
an optical system for forming a subject image on said imaging device; and
an image processing means for implementing image processing for an image obtained at said imaging device,
wherein said optical system has an MTF that satisfies the following condition:

$$0.1 \le La/Lb \le 1, 10 < a < 30, 5 < b < 20,$$

where La is an MTF width at an a % MTF, and Lb is an MTF width at a b % MTF.

30. The imaging apparatus according to claim 29, characterized in that said MTF satisfies the following condition:

$$1 \le MTF\_H/MTF\_L \le 2,$$

where MTF_H is a maximum peak value of MTF, and MTF_L is a minimum bottom value of MTF.

31. The imaging apparatus according to claim 29, characterized in that said MTF satisfies the following condition:

$$1 \le MTF\_H/MTF\_ave \le 1.7,$$

where MTF_H is the maximum peak value of MTF, and MTF_ave is an average value of MTF within an La range.

32. The imaging apparatus according to claim 29, characterized in that said MTF satisfies the following condition:

$$0.2 \le La/Lc \le 1.2,$$

where Lc is a half bandwidth of MTF.

33. The imaging apparatus according to claim 29, characterized in that said MTF has a spatial frequency that satisfies the following condition:

$$v=1/(2 \times P \times A), 1<A<20,$$

where v is the spatial frequency, and P is a pixel pitch of the imaging device.

34. The imaging apparatus according to claim 29, characterized in that said MTF has a spatial frequency that satisfies the following condition:

$$v=1/(2 \times P \times A), 2<A<8,$$

where v is the spatial frequency, and P is a pixel pitch of the imaging device.

35. The imaging apparatus according to claim 29, characterized in that said substantially constant MTF has a spatial frequency that satisfies the following condition:

$$0.001<v/N<3,$$

where ν is the spatial frequency, and N is the number of pixels on one side of the imaging device.

36. The imaging apparatus according to claim 29, characterized in that said MTF satisfies each of said conditions at a minimum F-number.

37. The imaging apparatus according to claim 29, characterized in that said MTF crosses an MTF of other spatial frequency but not so much that contrast becomes zero.

38. The imaging apparatus according to claim 37, characterized in that said MTF crosses the MTF of other spatial frequency at a 100 or less position.

39. The imaging apparatus according to claim 29, characterized in that spherical aberration characteristics of said optical system have a peak.

40. The imaging apparatus according to claim 39, characterized in that the spherical aberration characteristics of said optical system have two or more peaks.

41. The imaging apparatus according to claim 40, characterized in that the peaks of said spherical aberration characteristics are positioned on a plus side and a minus side.

42. The imaging apparatus according to claim 29, characterized in that said optical system comprises a wavefront control device for achieving said MTF.

43. The imaging apparatus according to claim 42, characterized in that the wavefront control device for achieving said MTF has an aspheric surface.

44. The imaging apparatus according to claim 42, characterized in that the wavefront control device for achieving said MTF is a phase plate.

45. The imaging apparatus according to claim 42, characterized in that the wavefront control device for achieving said MTF is a lens having a plurality of curvatures on one surface.

46. The imaging apparatus according to claim 45, characterized in that the wavefront control device for achieving said MTF is a lens having different curvatures at its center and its periphery.

47. The imaging apparatus according to claim 45, characterized in that the wavefront control device for achieving said MTF is a lens having three curvatures on one plane.

48. The imaging apparatus according to claim 42, characterized in that the wavefront control device for achieving said MTF is formed of a material for which a doubly refracting crystal is used.

49. The imaging apparatus according to claim 42, characterized in that the wavefront control device for achieving said MTF is detachable.

50. The imaging apparatus according to claim 29, characterized in that image processing implemented at said image processing means includes image restoration processing that is applied to an image obtained at said imaging device.

51. The imaging apparatus according to claim 50, characterized in that said image restoration processing makes use of imaging characteristic of said optical system.

52. The imaging apparatus according to claim 51, characterized in that said image restoration processing implements processing in which a restored image is represented by the following differential equation:

$$f(x,y)=g(x,y)+a_1(x,y) \cdot g(x,y)+ \ldots +a_n(x,y) \cdot g^{(n)}(x,y),$$

where f is the restored image, g is the image being viewed, $a_1, a_2, \ldots a_n$ are degradation parameters, and $g^{(n)}$ is an $n^{th}$ differential with respect to the image being viewed.

53. An imaging system, characterized by comprising: an imaging apparatus as recited in claim 29, and an external add-on for implementing image restoration processing for an image obtained at said imaging device.

54. The imaging system according to claim 53, characterized in that said image restoration processing makes use of image characteristic of said optical system.

55. The imaging system according to claim 53, characterized in that said image restoration processing implements processing in which a restored image is represented by the following differential equation:

$$f(x,y)=g(x,y)+a_1(x,y) \cdot g(x,y)+ \ldots +a_n(x,y) \cdot g^{(n)}(x,y),$$

where f is said restored image, g is said image, $a_1, a_2, \ldots a_n$ are degradation parameters, and $g^{(n)}$ is an $n^{th}$ differential with respect to said image.

56. The imaging system according to claim 53, characterized in that said imaging apparatus and said external add-on each comprise a communication means, via which an image obtained at said imaging device is transmitted to said external add-on.

* * * * *